(12) United States Patent
Tsukagoshi

(10) Patent No.: US 9,525,895 B2
(45) Date of Patent: Dec. 20, 2016

(54) TRANSMISSION DEVICE, TRANSMISSION METHOD, RECEPTION DEVICE, AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/412,784

(22) PCT Filed: Aug. 19, 2013

(86) PCT No.: PCT/JP2013/072088
§ 371 (c)(1),
(2) Date: Jan. 5, 2015

(87) PCT Pub. No.: WO2014/034463
PCT Pub. Date: Mar. 6, 2014

(65) Prior Publication Data
US 2015/0195587 A1    Jul. 9, 2015

(30) Foreign Application Priority Data

Aug. 27, 2012  (JP) ................................. 2012-187073

(51) Int. Cl.
*H04N 7/173* (2011.01)
*H04N 21/2343* (2011.01)
(Continued)

(52) U.S. Cl.
CPC ........ *H04N 21/23439* (2013.01); *H04N 19/33* (2014.11); *H04N 19/70* (2014.11);
(Continued)

(58) Field of Classification Search
CPC ............ H04N 7/17318; H04N 7/17338; H04N 21/47202; H04N 21/235; H04N 21/435
(Continued)

(56) References Cited

U.S. PATENT DOCUMENTS 5,852,565 A * 12/1998 Demos ................. H04N 5/4401
                                                         348/E5.108
6,323,909 B1 * 11/2001 Michener ................. H04N 7/52
                                                         348/512
(Continued)

FOREIGN PATENT DOCUMENTS

EP    2 288 170 A2    2/2011
EP    2 426 922 A1    3/2012
(Continued)

OTHER PUBLICATIONS

International Search Report issued Nov. 19, 2013 in PCT/JP2013/072088.
(Continued)

*Primary Examiner* — Annan Shang
(74) *Attorney, Agent, or Firm* — Oblon, McClelland, Maier & Neustadt, L.L.P.

(57) ABSTRACT

To allow a reception-side to appropriately cope with dynamic change of a distribution content, and perform correct stream reception.
In a first transmission mode, a basic video stream including image data in a lowest class and a predetermined number of enhancement video streams each including image data in a class other than the lowest class constituting scalable encoded image data are transmitted. In a second transmission mode, only the basic video stream including basic image data is transmitted. Identification information for identifying the first mode and the second mode is inserted into a video stream. The reception-side can easily find the transmission mode, and the reception-side can appropriately cope with change in a stream configuration, and more specifically, the reception-side can appropriately cope with dynamic change in a distribution content, thus capable of performing correct stream reception.

19 Claims, 29 Drawing Sheets

(51) Int. Cl.

| | | |
|---|---|---|
| *H04N 21/2362* | (2011.01) | |
| *H04N 21/2365* | (2011.01) | |
| *H04N 21/434* | (2011.01) | |
| *H04N 21/63* | (2011.01) | |
| *H04N 21/235* | (2011.01) | |
| *H04N 21/2389* | (2011.01) | |
| *H04N 21/462* | (2011.01) | |
| *H04N 19/70* | (2014.01) | |
| *H04N 19/33* | (2014.01) | |

(52) U.S. Cl.
CPC ..... *H04N 21/2358* (2013.01); *H04N 21/2362* (2013.01); *H04N 21/2365* (2013.01); *H04N 21/2389* (2013.01); *H04N 21/234327* (2013.01); *H04N 21/4345* (2013.01); *H04N 21/4347* (2013.01); *H04N 21/4621* (2013.01); *H04N 21/631* (2013.01)

(58) Field of Classification Search
USPC ..... 725/91–93, 114–116, 131–132, 139–140
See application file for complete search history.

(56) References Cited

U.S. PATENT DOCUMENTS

| | | | | |
|---|---|---|---|---|
| 6,526,051 | B1* | 2/2003 | Kandler | H04N 21/435 348/467 |
| 6,678,286 | B1* | 1/2004 | Fujiyama | H04N 7/181 370/223 |
| 6,771,703 | B1* | 8/2004 | Oguz | G11B 27/034 375/240.03 |
| 6,871,006 | B1* | 3/2005 | Oguz | G11B 27/031 348/E7.073 |
| 6,937,770 | B1* | 8/2005 | Oguz | H04N 19/176 375/240.2 |
| 8,793,721 | B1* | 7/2014 | Sharkey | H04N 21/44029 725/25 |
| 2003/0079222 | A1* | 4/2003 | Boykin | H04N 7/1675 725/31 |
| 2003/0118243 | A1* | 6/2003 | Sezer | G06T 9/005 382/245 |
| 2003/0147561 | A1* | 8/2003 | Faibish | G06T 9/005 382/245 |
| 2004/0017852 | A1* | 1/2004 | Garrido | H04N 7/0125 375/240.16 |
| 2004/0152479 | A1* | 8/2004 | Rainbolt | H04B 1/713 455/506 |
| 2006/0053442 | A1* | 3/2006 | Ridderheim | H04H 20/103 725/32 |
| 2007/0160126 | A1* | 7/2007 | Van Der Meer | H04N 21/234327 375/240 |
| 2007/0266398 | A1* | 11/2007 | Vandaele | H04N 7/17318 725/38 |
| 2008/0002765 | A1* | 1/2008 | Song | H03M 13/01 375/240.01 |
| 2008/0063378 | A1* | 3/2008 | Togo | H04N 9/8042 386/278 |
| 2008/0239062 | A1* | 10/2008 | Civanlar | H04N 7/152 348/14.09 |
| 2009/0265751 | A1* | 10/2009 | Limberg | H04N 21/2381 725/118 |
| 2009/0285283 | A1* | 11/2009 | Gao | G06T 5/009 375/240.08 |
| 2010/0134692 | A1* | 6/2010 | Costello | A63F 13/10 348/705 |
| 2010/0284472 | A1* | 11/2010 | Liao | H04N 21/4305 375/240.26 |
| 2011/0043614 | A1 | 2/2011 | Kitazato | |
| 2011/0116552 | A1 | 5/2011 | Mito et al. | |
| 2011/0149034 | A1* | 6/2011 | Tsukagoshi | H04N 13/0022 348/43 |
| 2012/0155554 | A1* | 6/2012 | Magee | H04N 21/23430 375/240.26 |
| 2013/0088572 | A1 | 4/2013 | Tsukagoshi | |
| 2013/0125188 | A1* | 5/2013 | Mandalia | H04N 5/76 725/110 |
| 2013/0307924 | A1* | 11/2013 | Cho | H04N 13/0051 348/43 |
| 2014/0071232 | A1* | 3/2014 | Tsukagoshi | H04N 13/0059 348/43 |

FOREIGN PATENT DOCUMENTS

| | | |
|---|---|---|
| JP | 2009-267537 A | 11/2009 |
| JP | 2011-57069 A | 3/2011 |
| JP | 2011-66871 A | 3/2011 |
| JP | 201 1-1 09469 | 6/2011 |
| WO | WO 2012/147596 A1 | 11/2012 |

OTHER PUBLICATIONS

Supplementary European Search Report issued Mar. 4, 2016 in European Patent Application No. 13832565.9.

Ikuo Tsukagoshi, "Sony Proposal to 3D/2D Signalling for 3DTV Phase 2A", DVB, Digital Video Broadcasting, c/o EBU-17A Ancienne Route-CH-1218 Grand Saconnex, Geneva, Switzerland, Sony Corporation, Apr. 11, 2012, XP017838942, 8 pages.

Ikuo Tsukagoshi, "Sony Proposal to 3D/2D Signalling for 3DTV Phase 2A, Further Consideration", DVB, Digital Video Broadcasting, c/o EBU-17A Ancienne Route-CH-1218 Grand Saconnex, Geneva, Switzerland, Sony Corporation, May 14, 2012, XP017838943, 9 pages.

* cited by examiner

SPATIAL RESOLUTION SCALABILITY (IN CASE OF TWO LAYERS)

TEMPORAL RESOLUTION SCALABILITY (IN CASE OF TWO LAYERS)

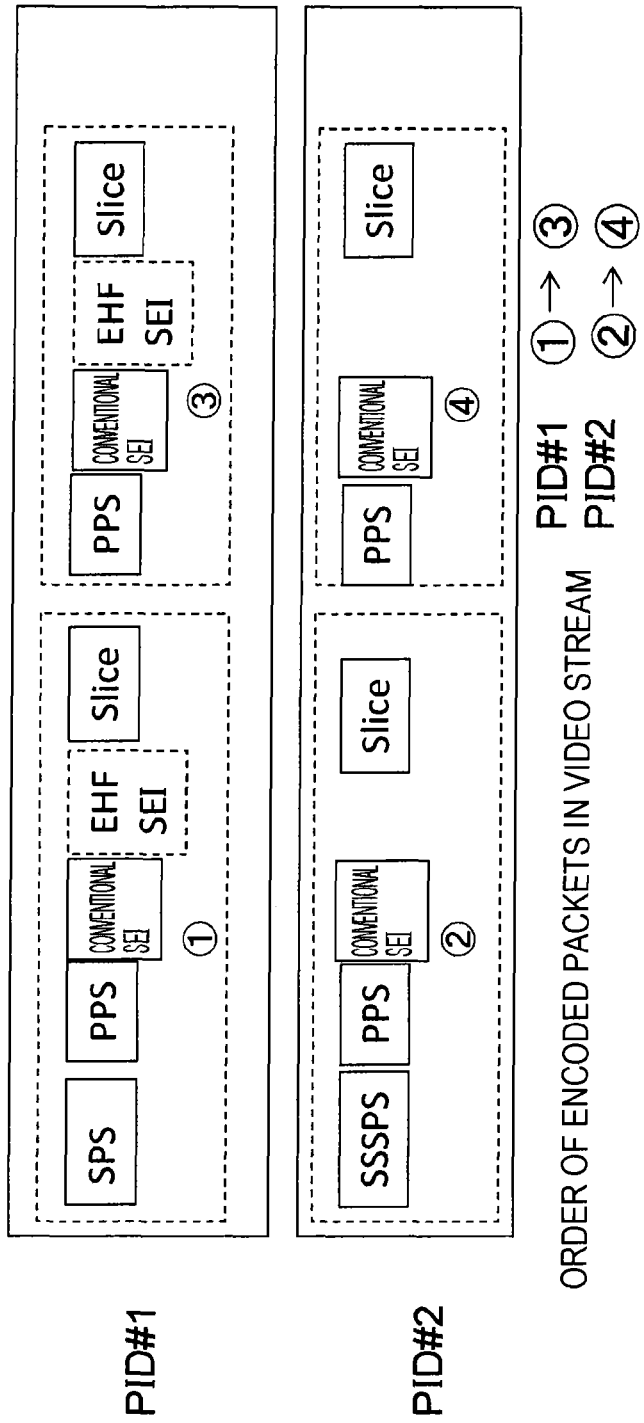

FIG. 19

ACCESS UNIT AT HEAD OF GOP

(a)

| AU Delimiter (ONE PIECE) | SPS (ONE PIECE) | PPS (ONE PIECE) | SEIs | Slices (Primary Coded Picture) (ONE OR MORE PIECES) | Filler data (ONE PIECE) | End of sequence (ONE PIECE) |

SEIs expanded:
| Buffering period SEI message (ONE PIECE) | Recovery point SEI message (ONE PIECE, REQUIRED ONLY IN CASE OF open GOP) | Picture timing SEI message (ONE PIECE) | Pan-scan rectangle SEI message (ONE PIECE) | Decoded reference Picture marking SEI message (ONE PIECE) | Enhancement scalability SEI message (ONE PIECE) |

ACCESS UNIT OTHER THAN AT HEAD OF GOP

(b)

| AU Delimiter (ONE PIECE) | PPS (ONE PIECE) | SEIs | Slices (Primary Coded Picture) (ONE OR MORE PIECES) | Filler data (ONE PIECE) | End of sequence (ONE PIECE) |

SEIs expanded:
| Picture timing SEI message (ONE PIECE) | Pan-scan rectangle SEI message (ONE PIECE) | Decoded reference Picture marking SEI message (ONE PIECE) | Enhancement scalability SEI message (ONE PIECE) |

☐ : REQUIRED
┌ ┐
└ ┘ : NOT REQUIRED

| Syntax | No. of Bits | Format |
|---|---|---|
| user_data_unregistered (size) { | | |
| uuid_iso_iec_11578 | 128 | uimslbf |
| for( i = 16; i < payloadSize; i++ ) | | |
| user_data_payload_byte | 8 | bslbf |
| } | | |

(b)

| Syntax | No. of Bits | Format |
|---|---|---|
| userdata_for_enhancement_scalability_data () { | | |
| userdata_id | 16 | uimslbf |
| enhancement_scalability_data_length | 8 | bslbf |
| enhancement_scalability_data () | | |
| } | | |

FIG. 21

| Syntax | No. of Bits | Format |
|---|---|---|
| enhancement_scalability_data() { | | |
|   enhancement_scalability_type | 2 | bslbf |
|   number_of_enhanced_streams | 3 | bslbf |
|   reserved | 3 | 0x7 |
|   for (I = 0 ; I < number_of_enhanced_streams ; I++) { | | |
|     spatial_scaling_ratio | 3 | bslbf |
|     temporal_scaling_ratio | 3 | bslbf |
|     reserved | 2 | 0x3 |
|   } | | |
| } | | |

FIG. 22

Semantics definition of enhancement_scalability_data enhancement_scalability_type (2bits)    INDICATING TYPE OF SCALABILITY ENHANCEMENT
    00    no scalability
    01    spatial scalability
    10    temporal scalability
    11    reserved number_of_enhanced_streams (3bits)    INDICATING NUMBER OF ENHANCEMENT VIDEO STREAMS
    000    0 stream
    001    1 stream
    010    2 streams
    011    3 streams
    1xx    reserved spatial_scaling_ratio (3bits)    INDICATING SPATIAL SCALING RATIO FOR COMBINING WITH DECODED picture IN IMMEDIATELY ABOVE enhancement layer, AND REPRESENTING COMBINATION OF HORIZONTAL PIXEL RATE AND VERTICAL PIXEL RATE FOR SCALING DECODED picture OF lower layer.
    000    No scaling
    001    Up scaling RATIOS IN BOTH OF HORIZONTAL AND VERTICAL DIRECTIONS ARE 50% (ENLARGING BY 3/2 TIMES)
    010    Up scaling RATIOS IN BOTH OF HORIZONTAL AND VERTICAL DIRECTIONS ARE 100% (ENLARGING BY 2 TIMES)
    011    Up scaling RATIOS IN BOTH OF HORIZONTAL AND VERTICAL DIRECTIONS ARE 150% (ENLARGING BY 5/2 TIMES)
    1xx    reserved temporal_scaling_ratio (3bits)    INDICATING TEMPORAL SCALING RATIO FOR COMBINING WITH DECODED picture IN IMMEDIATELY ABOVE enhancement layer, AND INDICATING NUMBER OF pictures IN enhancement layer DISPLAYED BETWEEN DECODED pictures IN lower layer.
    000    THERE IS NO picture INSERTION IN enhancement layer
    001    Picture INSERTION IN enhancement layer INCLUDES ONE picture
    010    Picture INSERTION IN enhancement layer INCLUDES TWO pictures
    011    Picture INSERTION IN enhancement layer INCLUDES THREE pictures
    1xx    reserved

FIG. 23

| Syntax | No. of Bits | Format |
|---|---|---|
| Scalable_enhancement_descriptor() { | | |
| scalable_enhancement_tag | 8 | uimslbf |
| scalable_enhancement_length | 8 | uimslbf |
| scalable_enhancement_type | 2 | bslbf |
| stream_delivery_type | 1 | bslbf |
| number_of_enhanced_streams | 3 | bslbf |
| reserved | 2 | 0x3 |
| } | | |

FIG. 24

Semantics definition of scalable_enhancement_descriptor

Scalable_enhancement_type (2bits)    INDICATING TYPE OF SCALABILITY ENHANCEMENT
    00    no scalability
    01    spatial scalability
    10    temporal scalability
    11    reserved stream_delivery_type (1bit)    INDICATING VIDEO ELEMENTARY STREAM CONFIGURATION PROVIDING BASIC AND ENHANCEMENT VIDEO STREAMS
    1    EACH VIDEO STREAM IS PROVIDED IN SINGLE VIDEO ELEMENTARY STREAM
    0    EACH VIDEO STREAM IS PROVIDED IN MULTIPLE VIDEO ELEMENTARY STREAMS number_of_enhanced_streams (3bits)    INDICATING NUMBER OF ENHANCEMENT VIDEO STREAMS
    000    reserved
    001    1 stream
    010    2 streams
    011    3 streams
    1xx    reserved

| Syntax | No. of Bits | Format |
|---|---|---|
| Multiple_stream_descriptor() { | | |
| multiple_stream_tag | 8 | uimslbf |
| multiple_stream_length | 8 | uimslbf |
| reserved | 5 | 0x1F |
| number_of_video_streams | 3 | bslbf |
| } | | |

Semantics definition of number_of_video_streams (b)

| Values | Description |
|---|---|
| 000 | reserved |
| 001 | 1 stream |
| 010 | 2 streams |
| 011 | 3 streams |
| 100 | 4 streams |
| 1xx | reserved |

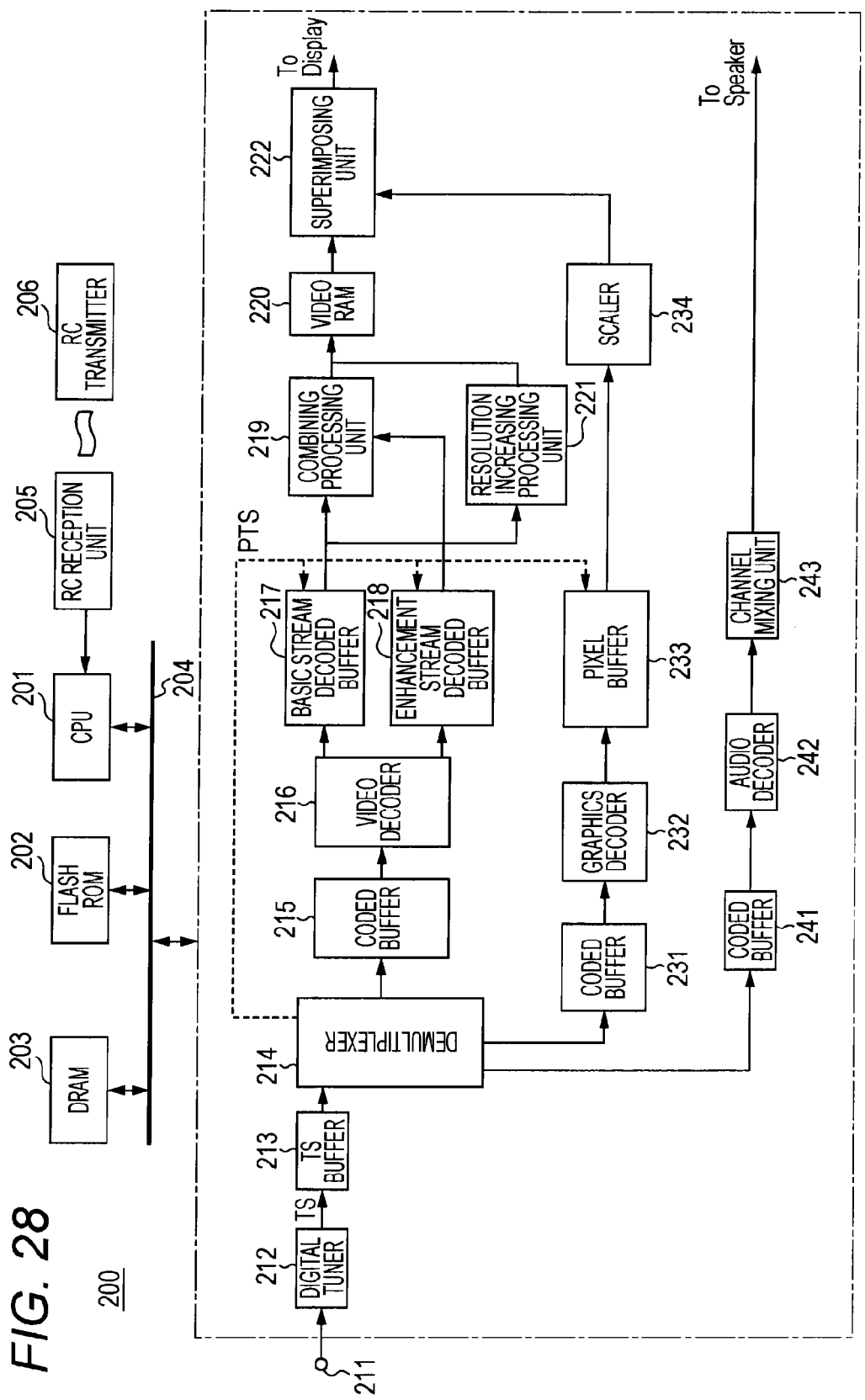

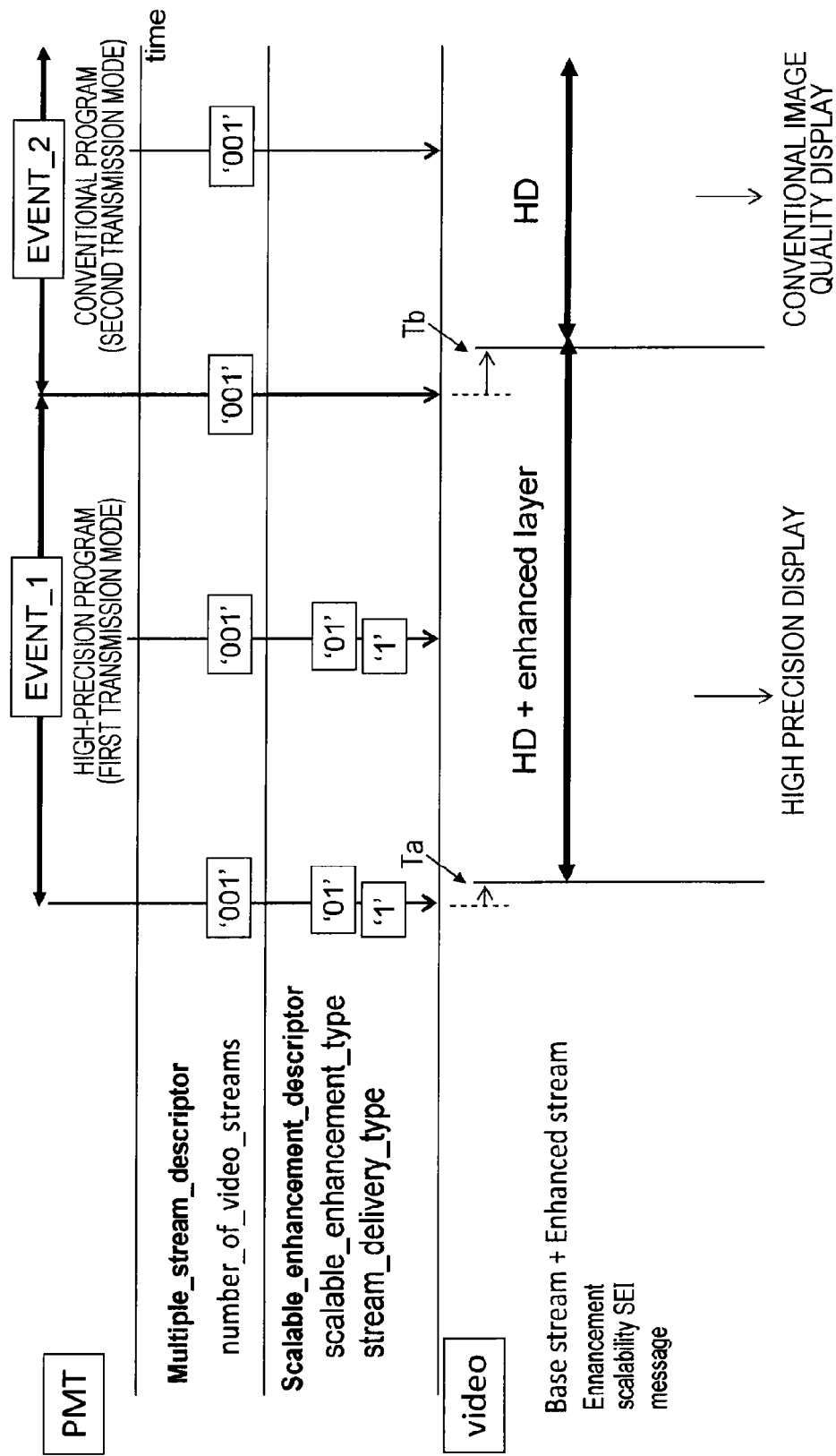

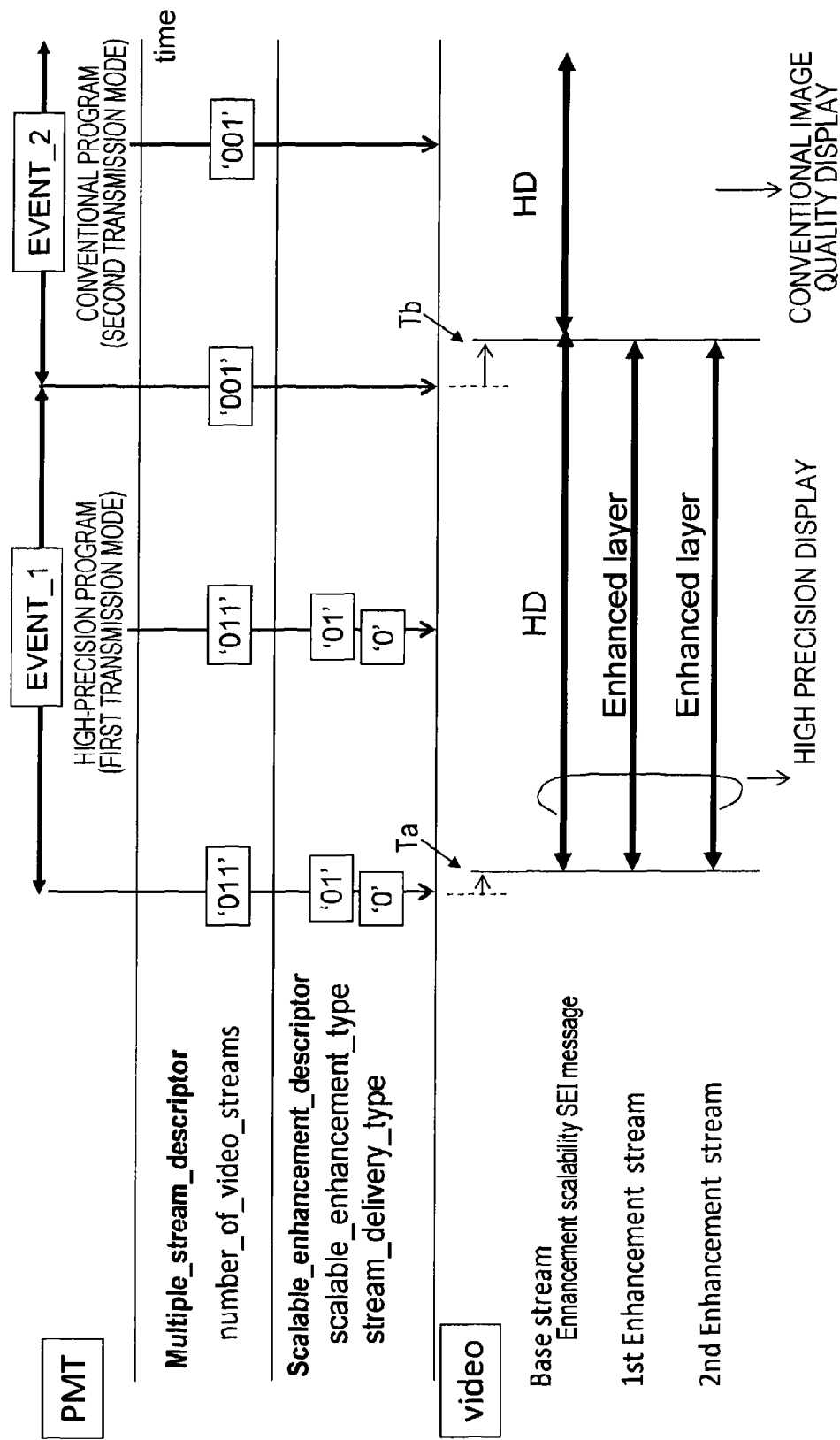

TRANSMISSION DEVICE, TRANSMISSION METHOD, RECEPTION DEVICE, AND RECEPTION METHOD

TECHNICAL FIELD

The present technique relates to a transmission device, a transmission method, a reception device, and a reception method, and more particularly, relates to a transmission device and the like configured to transmit, in a time divisional manner, image data of a conventional image and image data of a spatially or temporally very high resolution image.

BACKGROUND ART

In the past, services have been considered for not only an HD image in which the number of effective pixels is 1920×1080 pixels but also spatially very high resolution images such as 4K, 8K, and the like, which have two times and four times, respectively, many pixels than the number of effective pixels in each of the horizontal and vertical directions (for example, see Patent Document 1). On the other hand, services have been considered for not only images of 60 fps of which frame frequency is 60 Hz but also temporally very high resolution images of which frame frequencies are 120 Hz, 240 Hz, and the like.

CITATION LIST

Patent Document

Patent Document 1: JP 2011-057069 A

SUMMARY OF THE INVENTION

Problems to be Solved by the Invention

For example, in services such as broadcasting and networks, a method is considered to transmit, in a time divisional manner, image data of conventional image (for example, HD resolution, 25 fps, 30 fps images, and the like) and image data of spatially or temporally very high resolution images (scalable encoded image data). At this occasion, it is necessary for a receiver supporting very high resolution images at the reception side to switch processing in synchronization with switching of image data.

Solutions to Problems

An object of the present technique is to appropriately cope with change in a stream configuration, and more specifically, to appropriately cope with dynamic change of a distribution content, and capable of performing correct stream reception.

A concept of the present technique lies in a transmission device including:

a transmission unit configured to transmit one or more video streams; and an identification information insertion unit configured to insert, into the video stream, identification information for identifying a first transmission mode for transmitting a basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data.

In the present technique, the transmission unit transmits one or more video streams. In the first transmission mode, the basic video stream including image data in the lowest class constituting the scalable encoded image data and the predetermined number of enhancement video streams each including image data in a class other than the lowest class constituting the scalable encoded image data are transmitted. In the second transmission mode, only the basic video stream including the basic image data is transmitted.

For example, in the first transmission mode, the basic video stream and the predetermined number of enhancement video streams are inserted into one or more video elementary streams and are transmitted. In a case where the basic video stream and the predetermined number of enhancement video streams are inserted into a single video elementary stream to be transmitted, information indicating a stream border may be arranged between the video streams. Therefore, the data at the head of the pictures of each video stream can be accessed instantly.

The identification information insertion unit inserts, into the video stream, the identification information for identifying the first transmission mode and the second transmission mode. For example, the identification information insertion unit may insert the identification information in at least a program unit, a scene unit, a picture group unit, or a picture unit.

For example, in the first transmission mode, the identification information insertion unit may insert, into the video stream, the identification information indicating the first transmission mode, and in the second transmission mode, the identification information insertion unit may insert, into the video stream, the identification information indicating the second transmission mode. For example, in the first transmission mode, the identification information insertion unit may insert, into the video stream, the identification information indicating the first transmission mode, and in the second transmission mode, the identification information insertion unit may not insert the identification information into the video stream. For example, in the first transmission mode, the identification information insertion unit may not insert the identification information into the video stream, and in the second transmission mode, the identification information insertion unit may insert, into the video stream, the identification information indicating the second transmission mode.

For example, when the identification information indicates the first transmission mode, the identification information may include information indicating the number of enhancement video streams. For example, when the identification information indicates the first transmission mode, the identification information may include information indicating the type of scalability enhancement. For example, when the identification information indicates the first transmission mode, the identification information may include information indicating the scaling ratio for combining with the upper class in scalability enhancement.

As described above, according to the present technique, in the first transmission mode, the basic video stream including image data in the lowest class constituting the scalable encoded image data and the predetermined number of enhancement video streams each including image data in a class other than the lowest class constituting the scalable encoded image data are transmitted. In the second transmission mode, only the basic video stream including the basic image data is transmitted. Then, the identification information for identifying the first mode and the second mode is inserted into the video stream.

Therefore, the reception-side can easily find whether the mode is the first transmission mode or the second transmission mode on the basis of the identification information, and the reception-side can appropriately cope with change in a stream configuration, and more specifically, the reception-side can appropriately cope with dynamic change in a distribution content, thus capable of performing correct stream reception. More specifically, when image data of conventional image (for example, HD resolution, 25 fps, 30 fps images, and the like) and image data of spatially or temporally very high resolution image (scalable encoded image data) are transmitted in a time divisional manner, the reception-side can switch the processing in a preferable manner.

According to the present technique, for example, the transmission unit may transmit a container of a predetermined format including the one or more video streams, and the transmission device may further include an identification information insertion unit configured to insert, into a layer of the container, identification information for identifying whether the mode is the first transmission mode or the second transmission mode. As described above, the identification information inserts into the layer of the container, and therefore, the reception-side can perform flexible operation.

For example, when the identification information indicates the first transmission mode, the identification information may be attached with information indicating the type of scalability enhancement. For example, the identification information may be attached with information indicating whether one or more video streams are provided in a single video elementary stream or not. For example, when the identification information indicates the first transmission mode, the identification information may be attached with information indicating the number of enhancement video streams.

According to the present technique, the transmission unit may transmit a container of a predetermined format including the one or more video streams, and the transmission device may further include an identification information insertion unit configured to insert, into a layer of the container, identification information for identifying the number of video elementary streams into which the one or more video streams are inserted.

Another concept of the present technique lies in a reception device including:

a reception unit configured to receive one or more video streams;

a transmission mode identification unit configured to identify, on the basis of identification information inserted into the video stream, a first transmission mode for transmitting a basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data; and a processing unit configured to perform processing according to each mode based on the mode identification result to process the received video stream, and obtain image data to be displayed.

According to the present technique, the reception unit receives one or more video streams. In the first transmission mode, the basic video stream including image data in the lowest class constituting scalable encoded image data and the predetermined number of enhancement video streams each including image data in the class other than the lowest class constituting the scalable encoded image data are received. In the second transmission mode, only the basic video stream including the basic image data may be received.

The transmission mode identification unit identifies whether the mode is the first transmission mode or the second transmission mode on the basis of the identification information inserted into the video stream. The processing unit performs processing according to each mode based on the mode identification result to process the received video stream, and obtain image data to be displayed.

As described above, according to the present technique, in the first transmission mode, the basic video stream including image data in the lowest class constituting scalable encoded image data and the predetermined number of enhancement video streams each including image data in a class other than the lowest class constituting the scalable encoded image data are received. In the second transmission mode, only the basic video stream including the basic image data is received. Then, whether the mode is the first transmission mode or the second transmission mode is identified on the basis of the identification information inserted into the video stream.

Then, processing is performed according to each mode based on the identified mode to process the received video stream, and the image data are obtained to be displayed. Therefore, the reception-side can easily find whether the mode is the first transmission mode or the second transmission mode, and the reception-side can appropriately cope with change in a stream configuration, and more specifically, the reception-side can appropriately cope with dynamic change in a distribution content, thus capable of performing correct stream reception. More specifically, when image data of conventional image (for example, HD resolution, 25 fps, 30 fps images, and the like) and image data of spatially or temporally very high resolution image (scalable encoded image data) are transmitted in a time divisional manner, the reception-side can switch the processing in a preferable manner.

According to the present technique, for example, the reception unit may receive a container of a predetermined format including the video stream, and the identification information for identifying whether the mode may be the first transmission mode or the second transmission mode is inserted into the layer of the container, and the transmission mode identification unit may identify whether the mode is the first transmission mode or the second transmission mode on the basis of the identification information inserted into the layer of the container and the identification information inserted into the video stream.

Effects of the Invention

According to the present technique, it is possible to appropriately cope with change in a stream configuration, and more specifically, to appropriately cope with dynamic change of a distribution content, and capable of performing correct stream reception.

BRIEF DESCRIPTION OF DRAWINGS

FIG. 18 is a figure illustrating encoded packet order in each stream in a case where each video stream including a basic video stream and a predetermined number of enhancement video streams are inserted into a single video elementary stream (Multiple PID).

FIGS. 19(a) and 19(b) are figures illustrating an example of configuration of an access unit at the head of the GOP (Group Of Pictures) and an access unit other than at the head thereof.

FIGS. 20(a) and 20(b) are figures illustrating an example of structure of SEI message "Enhancement scalability SEI message".

FIG. 21 is a figure illustrating an example of structure of enhancement scalability data (enhancement_scalability_data( )).

FIG. 22 is a figure illustrating contents of main information in the example of structure of the enhancement scalability data (enhancement_scalability_data( )).

FIG. 23 is a figure illustrating an example of structure of scalable enhancement descriptor (Scalable_enhancement_descriptor).

FIG. 24 is a figure illustrating contents of main information in the example of structure of scalable enhancement descriptor (Scalable_enhancement_descriptor).

FIG. 25 is a figure illustrating an example of structure of multiple stream descriptor (Multiple_stream_descriptor).

FIG. 28 is a block diagram illustrating an example of configuration of a receiver constituting an image transmission/reception system.

FIG. 29 is a figure for explaining switching control of reception processing when switching a high-precision program and a conventional program.

FIG. 30 is a figure for explaining switching control of reception processing when switching a high-precision program and a conventional program.

MODE FOR CARRYING OUT THE INVENTION

Hereinafter, a mode for carrying out the invention (hereinafter referred to as "embodiment") will be explained. It should be noted that the explanation will be given in the following order.

1. Embodiment
2. Modification

1. Embodiment

Image Transmission/Reception System

Figure 1:
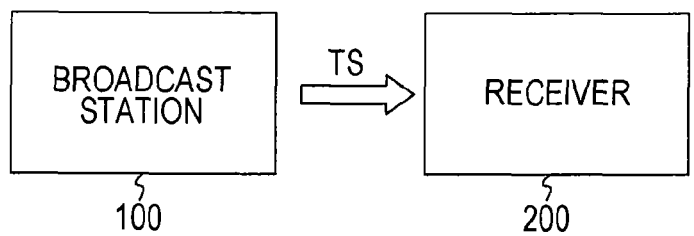
FIG. 1 is a block diagram illustrating an example of configuration of an image transmission/reception system according to an embodiment.

FIG. 1 illustrates an example of configuration of an image transmission/reception system 10 according to an embodiment. This image transmission/reception system 10 includes a broadcast station 100 and a receiver 200. The broadcast station 100 transmits a transport stream TS serving as a container in such a manner that the transport stream TS is carried by a broadcast wave.

In a first transmission mode, and more specifically, during transmission of scalable encoded image data for enabling a spatial or a temporal very high resolution image to be displayed, the transport stream TS includes multiple video streams (video sub-streams). In this case, the transport stream TS includes a basic video stream including image data of the lowest class constituting scalable encoded image data and a predetermined number of enhancement video streams including image data of classes other than the lowest class constituting scalable encoded image data.

In a second transmission mode, and more specifically, during transmission of image data of a conventional image (for example, HD resolution, 25 fps, 30 fps images, and the like), the transport stream TS includes a single video stream (video sub-stream). In this case, the transport stream TS includes only a basic video stream including image data of a conventional image as basic image data.

Figure 2:
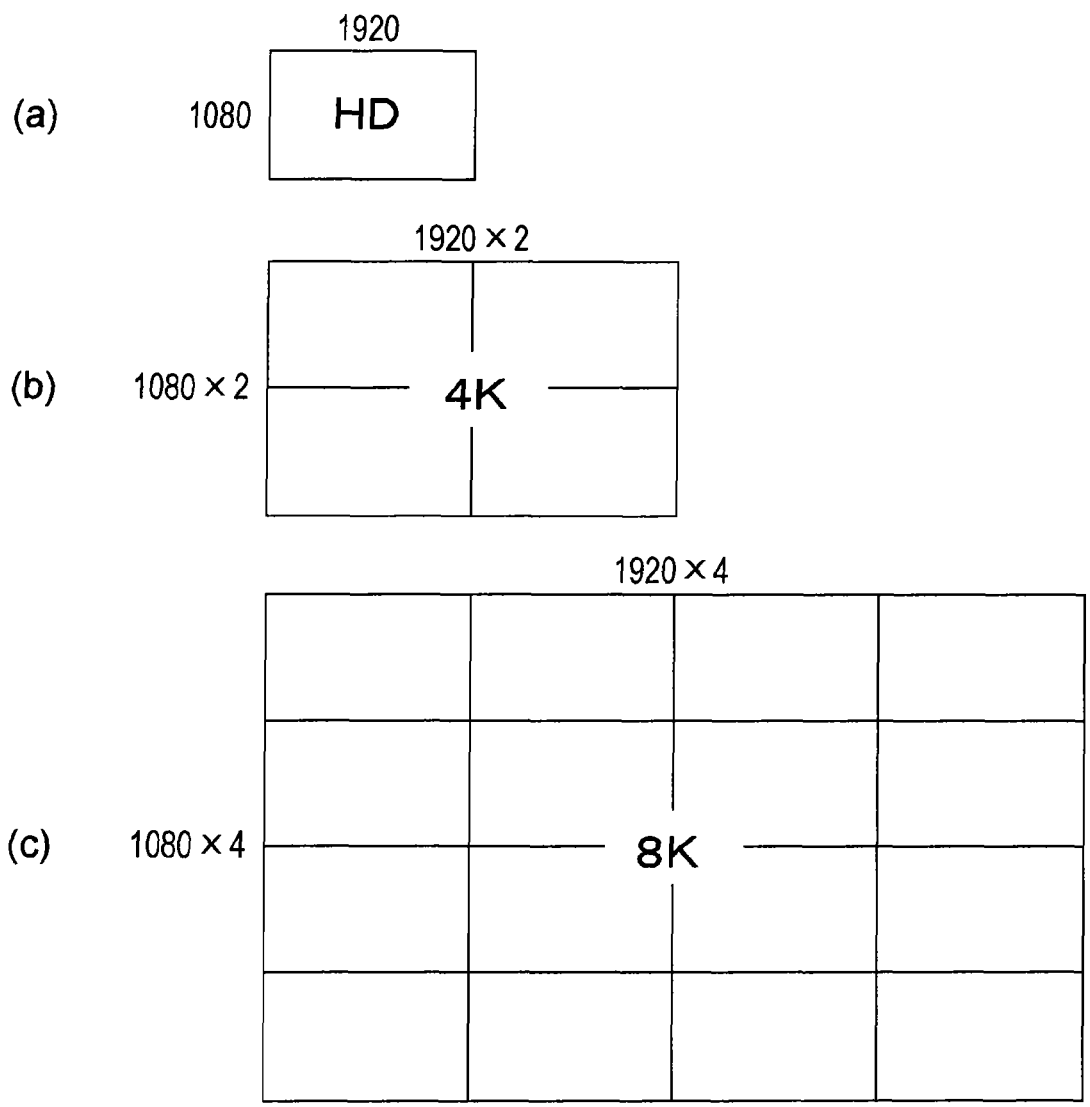
FIGS. 2(a) to 2(c) are figures illustrating examples of image data of which spatial resolutions are different.

FIG. 2(a) illustrates image data of an HD image in which the number of effective pixels is 1920*1080, which serves as image data of a conventional image. FIG. 2(b) illustrates image data of 4K in which the number of effective pixels is two times as many as those of the HD (High-Definition) in the horizontal and vertical directions, which serves as image data of a spatially very high resolution. FIG. 2(c) illustrates image data of 8K in which the number of effective pixels is four times as many as those of the HD in the horizontal and vertical directions, which serves as image data of a spatially very high resolution.

Figure 3:
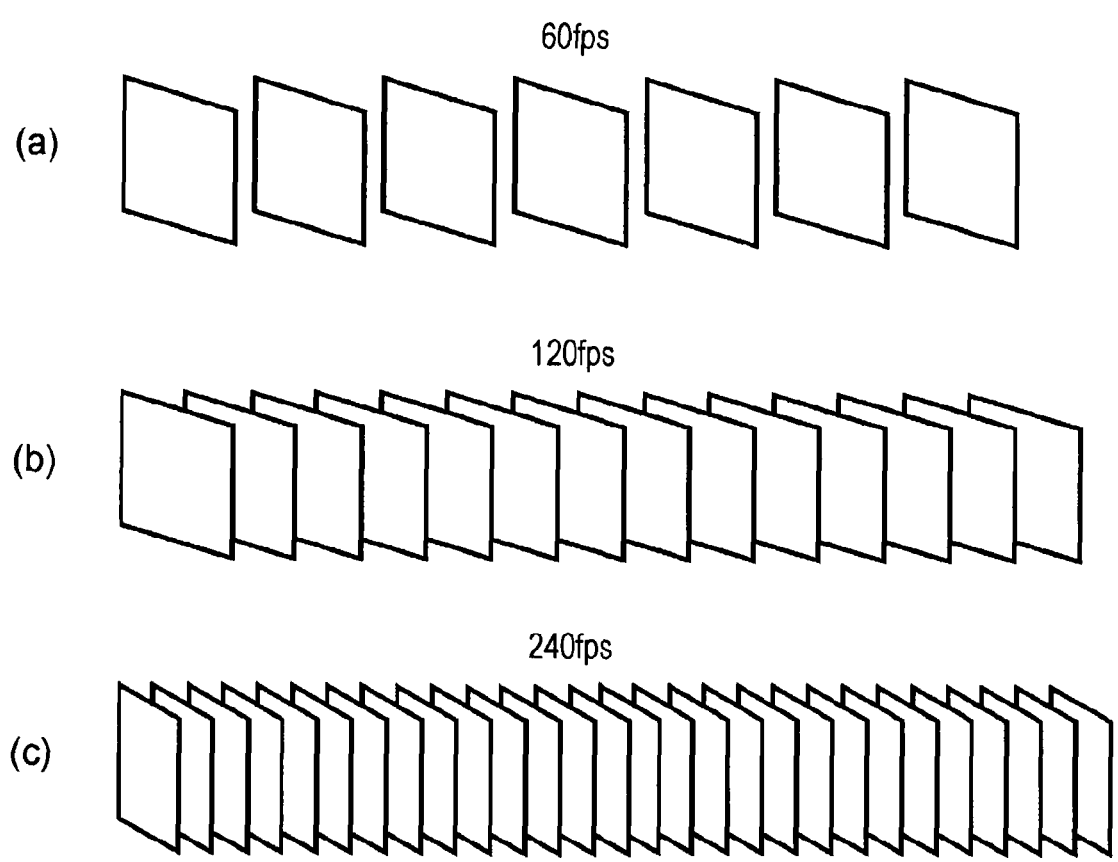
FIGS. 3(a) to 3(c) are figures illustrating examples of image data of which temporal resolutions are different.

FIG. 3(a) illustrates image data of 60 fps of which frame frequency is 60 Hz, which serves as image data of a conventional image. FIG. 3(b) illustrates image data of 120 fps of which frame frequency is 120 Hz, which serves as image data of a temporally very high resolution. FIG. 3(c) illustrates image data of 240 fps of which frame frequency is 240 Hz, which serves as image data of a temporally very high resolution.

Figure 4:
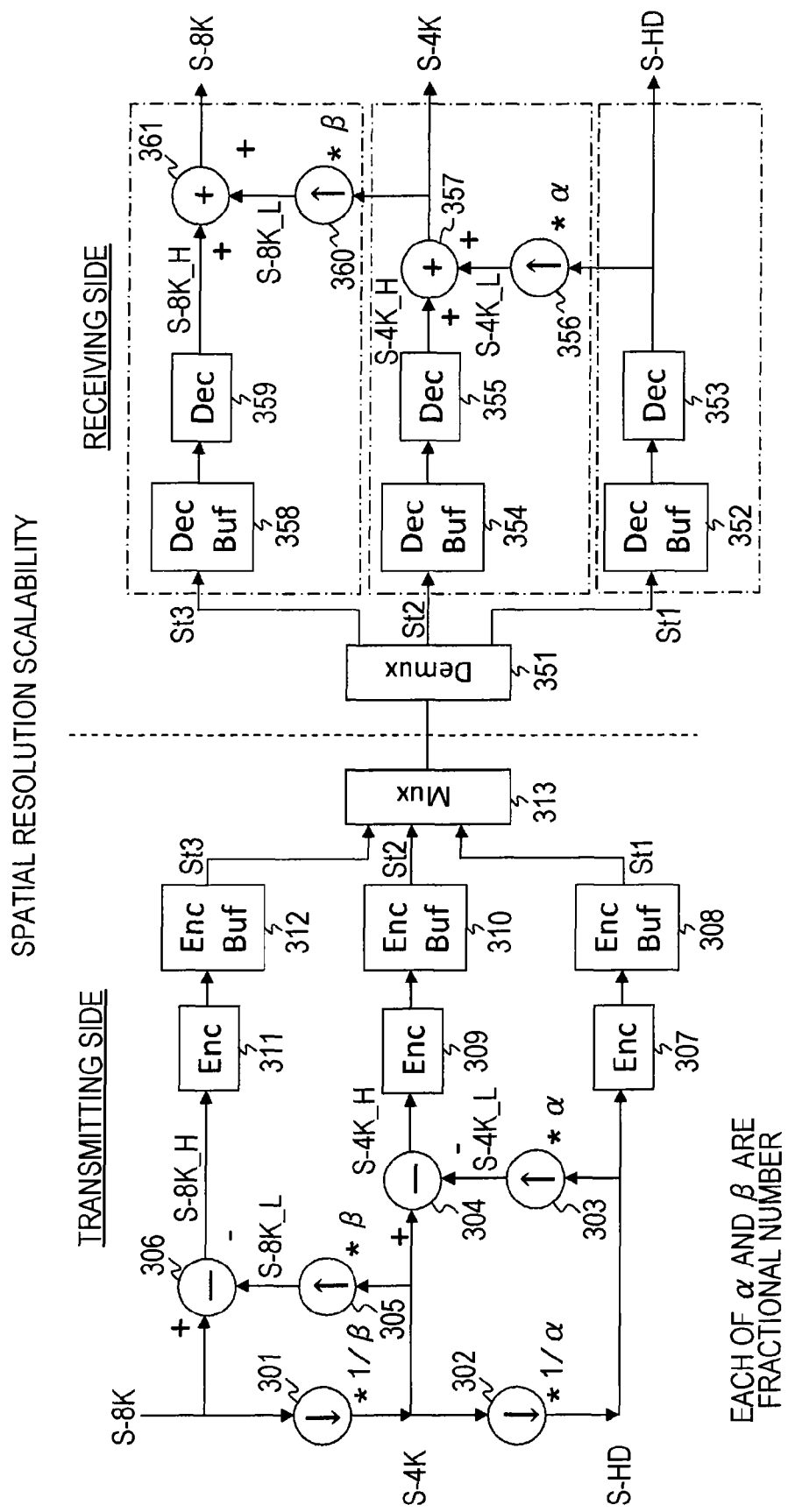
FIG. 4 is a figure illustrating an example of spatial resolution scalability.

FIG. 4 illustrates an example of spatial resolution scalability. This example is an example for treating, e.g., 8K image data S-8K, which are image data of a spatially very high resolution. First, the transmission side (encoding side) will be explained. The downsampling unit 301 applies downsampling processing by $1/\beta$ times to the image data S-8K. In this case, the downsampling unit 301 applies downsampling processing by ½ times to the image data S-8K to generate 4K image data S-4K. In addition, the downsampling unit 302 applies downsampling processing by $1/\alpha$ times to the image data S-4K. In this case, the downsampling unit 302 applies downsampling processing by ½ times to the image data S-4K to generate HD image data S-HD.

The upsampling unit 303 applies upsampling processing by $\alpha$ times to the image data S-HD. In this case, the upsampling unit 303 applies upsampling processing by two times to the image data S-HD to generate 4K image data S-4K_L. This 4K image data S-4K_L are obtained by applying the downsampling processing and the upsampling processing to the image data S-4K, and the 4K image data S-4K_L lacks a high frequency component in the level of 4K. The subtracter 304 subtracts the image data S-4K_L from the image data S-4K and generates a high frequency component S-4K_H in the level of 4K.

The upsampling unit 305 applies upsampling processing by $\beta$ times to the image data S-4K. In this case, the upsampling unit 305 applies upsampling processing by two times to the image data S-4K to generate 8K image data S-8K_L. This 8K image data S-8K_L are obtained by applying the downsampling processing and the upsampling processing to the image data S-8K, and the 8K image data S-8K_L lacks a high frequency component in the level of 8K. The subtracter 306 subtracts the image data S-8K_L from the image data S-8K and generates a high frequency component S-8K_H in the level of 8K.

The image data S-HD constitute image data in the first class (the lowest class). The image data S-HD are encoded by the video encoder 307, so that a basic video stream St1 is obtained. This basic video stream St1 is temporarily accumulated to the encoding buffer 308. The high frequency component S-4K_H in the level of 4K constitutes image data in the second class. This high frequency component S-4K_H is encoded by the video encoder 309, so that a first enhancement video stream St2 is obtained. This first enhancement video stream St2 is temporarily stored to the encoding buffer 310.

The high frequency component S-8K_H in the level of 8K constitutes image data in the third class. This high frequency component S-8K_H is encoded by the video encoder 311, so that a second enhancement video stream St3 is obtained. This second enhancement video stream St3 is temporarily stored to the encoding buffer 312. The basic video stream St1, the first enhancement video stream St2, and the second enhancement video stream St3 are combined by the multiplexer 313, and the combined stream is transmitted to the reception-side.

Subsequently, the reception-side (decoding-side) will be explained. The demultiplexer 351 separates the basic video stream St1, the first enhancement video stream St2, and the second enhancement video stream St3 from the combined stream. The basic video stream St1 is temporarily accumulated in the decoding buffer 352. Then, this basic video stream St1 is decoded by the decoder 353, so that HD image data S-HD are obtained as image data in the first class (the lowest class). With this image data S-HD, the HD images can be displayed.

The first enhancement video stream St2 is temporarily stored to the decoding buffer 354. Then, this first enhancement video stream St2 is decoded by the decoder 355, so that a high frequency component S-4K_H in the level of 4K is obtained as image data in the second class. The upsampling unit 356 applies upsampling processing by $\alpha$ times to the image data S-HD. In this case, the upsampling unit 356 applies upsampling processing by 2 times to the image data S-HD to generate 4K image data S-4K_L. The adder 357 adds the high frequency component S-4K_H in the level of 4K to the 4K image data S-4K_L, so that 4K image data S-4K are obtained. With the image data S-4K, the 4K images can be displayed.

The second enhancement video stream St3 is temporarily stored to the decoding buffer 358. Then, this second enhancement video stream St3 is decoded by the decoder 359, so that a high frequency component S-8K_H in the level of 8K is obtained as image data in the third class. The upsampling unit 360 applies upsampling processing by $\beta$ times to the image data S-4K. In this case, the upsampling unit 360 applies upsampling processing by two times to the image data S-4K to generate 8K image data S-8K_L. The adder 361 adds the high frequency component S-8K_H in the level of 8K to the 8K image data S-8K_L, so that 8K image data S-4K are obtained. With the image data S-8K, 8K images can be displayed.

Figure 5:
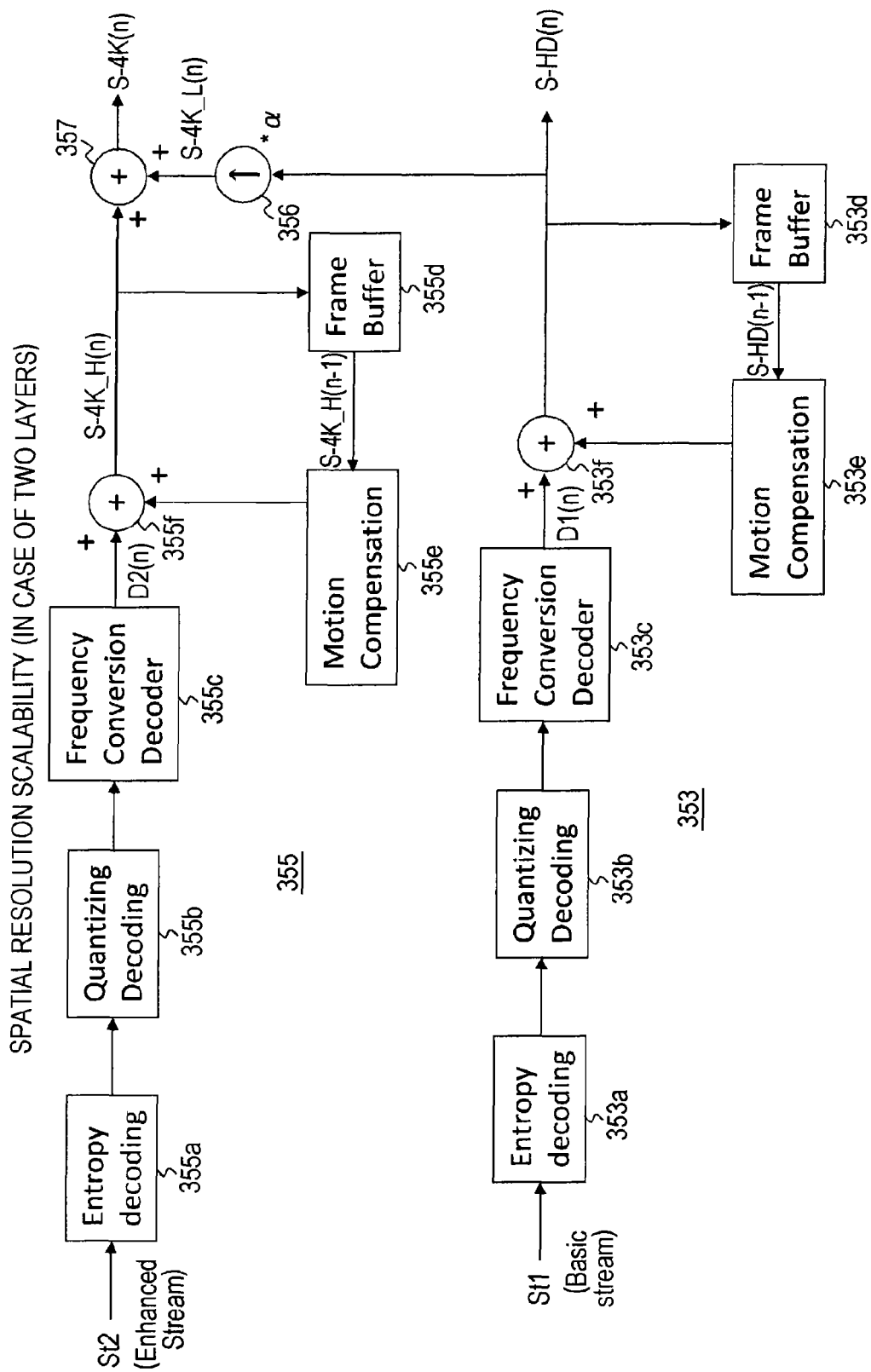
FIG. 5 is a figure illustrating an example of specific configuration of spatial resolution scalability at a reception-side (decoding-side).

FIG. 5 illustrates an example of specific configuration of the reception-side (decoding-side) with the spatial resolution scalability explained above. This example of configuration shows a case where there are two layers (the first class, the second class). An entropy decoding unit 353a performs entropy decode processing on the basic video stream St1, and a quantizing decoding unit 353b performs inverse-quantizing processing on the basic video stream St1. Further, a frequency conversion decoder 353c processes the inverse-quantized data to change the data from frequency axis data back to temporal axis data, thus obtaining data D1(n).

An adder 353f adds image data S-HD(n−1) of a previous frame obtained from the frame buffer 353d, which has been processed in the motion compensation processing performed by a motion compensation unit 353e, to the data D1 (n) which has been processed in the frequency conversion decoding. Then, this adder 353f provides HD image data S-HD(n) of the current frame.

An entropy decoding unit 355a performs entropy decode processing on the first enhancement video stream St2, and a quantizing decoding unit 355b performs inverse-quantizing processing on the first enhancement video stream St2. Further, a frequency conversion decoder 355c processes the inverse-quantized data to change the data from frequency axis data back to temporal axis data, thus obtaining data D2(n).

An adder 355f adds a high frequency component S-4K_H (n−1) of a previous frame obtained from the frame buffer 355d, which has been processed in the motion compensation processing performed by a motion compensation unit 355e, to the data D2(n) which has been processed in the frequency conversion decoding. This adder 355f provides a high frequency component S-4K_H(n) in the level of 4K of the current frame. The upsampling unit 356 applies upsampling processing by α times to the image data S-HD(n). In this case, the upsampling unit 356 applies upsampling processing by 2 times to the image data S-HD(n) to generate 4K image data S-4K_L(n). The adder 357 adds the high frequency component S-4K_H(n) in the level of 4K to the 4K image data S-4K_L(n), thus producing the 4K image data S-4K(n) of the current frame.

Figure 6:
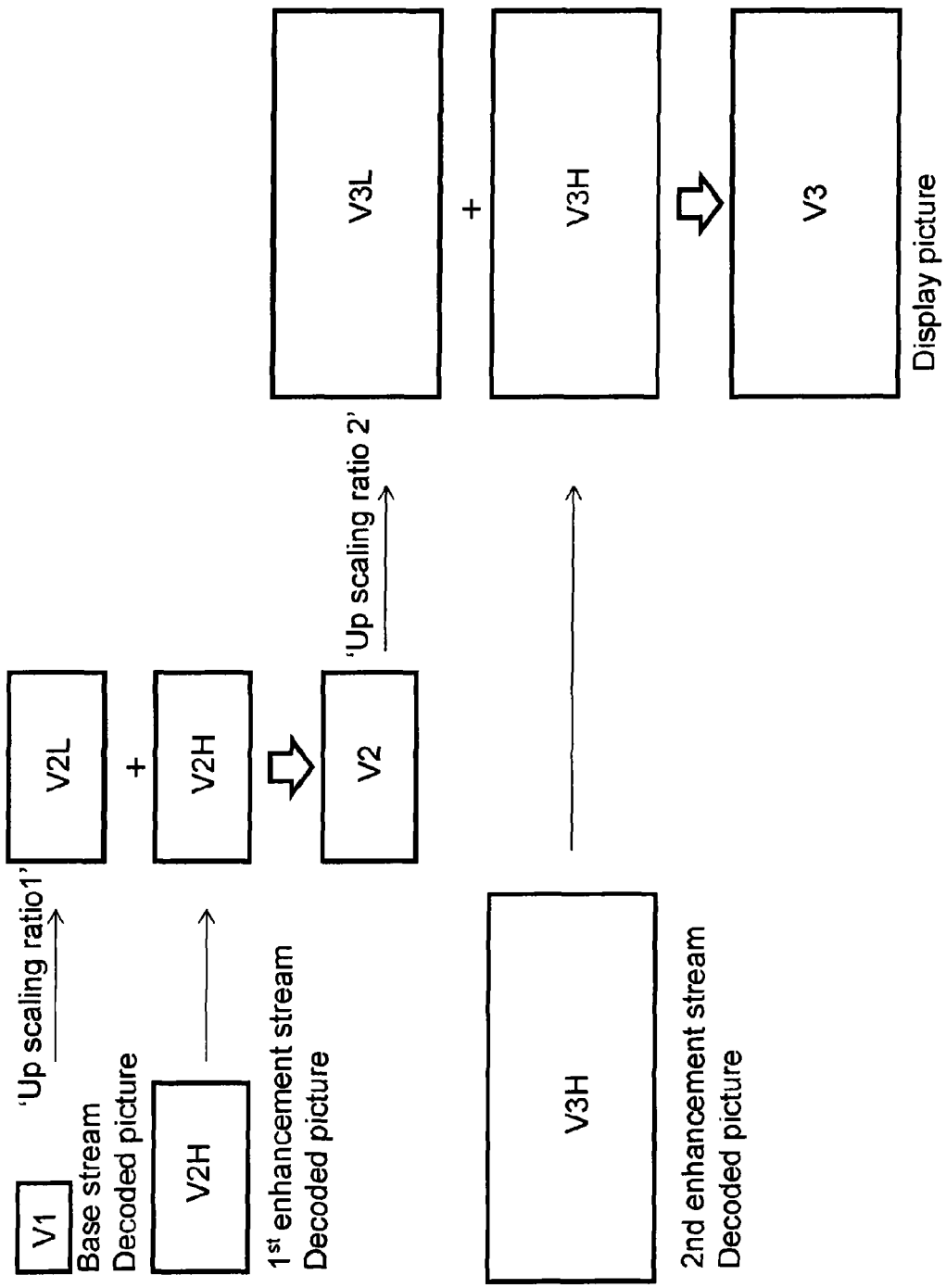
FIG. 6 is a figure illustrating an example of decoding process of spatial resolution scalability.

FIG. 6 illustrates an example of decoding process of the spatial resolution scalability. In this example, there is a basic video stream (Base stream) including image data in the first class (the lowest class). In this example, there area first enhancement video stream (1st enhancement stream) including image data in the second class (high frequency component) and a second enhancement video stream (2nd enhancement stream) including image data in the third class (high frequency component). In this example, the spatial resolution of the basic video stream is up-scaled by an "up scaling ratio 1" with the first enhancement video stream, and is further up-scaled by an "up scaling ratio 2" with the second enhancement video stream.

The image data V1 in the first class is obtained by decoding the basic video stream. The image data V1 is upsampled, so that image data V2L are obtained by upscaling the horizontal and vertical resolutions of the image data V1 by the "up scaling ratio 1". The image data V2H in the second class are obtained by decoding the first enhancement video stream. The image data V2L, V2H are added, and the image data V2 are obtained by upscaling the horizontal and vertical resolutions by the "up scaling ratio 1" with respect to the image data V1.

The image data V2 are upsampled, so that image data V3L are obtained by upscaling the horizontal and vertical resolutions of the image data V2 by the "up scaling ratio 2". The image data V3H in the third class are obtained by decoding the second enhancement video stream. The image data V3L, V3H are added, and the image data V3 which are to be displayed are obtained by upscaling the horizontal and vertical resolutions by the "up scaling ratio 2" with respect to the image data V2.

Figure 7:
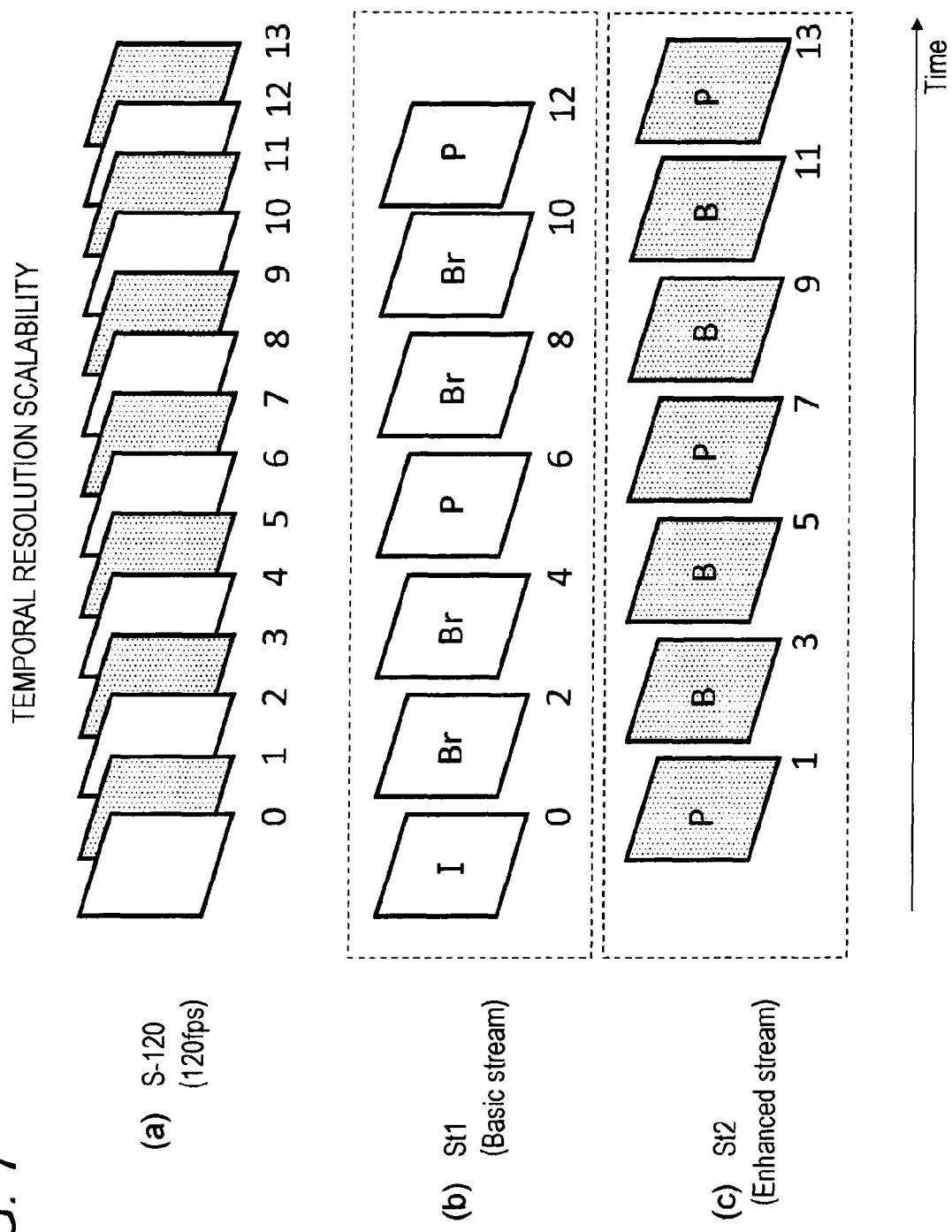
FIGS. 7(a) to 7(c) are figures illustrating an example of temporal resolution scalability.

FIGS. 7(a) to 7(c) illustrate an example of temporal resolution scalability. In this example, image data S-120 of 120 fps are treated as image data of a temporally very high resolution as shown in FIG. 7(a). The image data S-120 is separated into two classes which include a first class (the lowest class) and a second class.

Image data in the first class (image data of even-numbered frames) are encoded, for example, as shown in FIG. 7(b), so that a basic video stream St1 is generated. This basic video stream St1 is constituted by I picture (Intra picture), P picture (Predictive picture), and B picture (Bi-directional predictive picture). The I picture does not refer to other pictures, and the P picture and the B picture refers to only the I picture or the P picture in the basic video stream St1. Therefore, this basic video stream St1 can be decoded alone without depending any other stream.

The image data in the second class (image data of odd-numbered frames) are encoded, for example, as shown in FIG. 7(c), so that the first enhancement video stream St2 is generated. This first enhancement video stream St2 is constituted by P picture and B picture. The P picture and the B picture refer to not only the P picture in this first enhancement video stream St2 but also the I picture, the P picture, and further the B picture in the basic video stream St1. Therefore, this first enhancement video stream St2 requires not only this stream but also the decoding result of the basic video stream St1.

The B picture in the first enhancement video stream St2 in FIG. 7(c) is denoted as "B", whereas the B picture in the basic video stream St1 in FIG. 7(b) is denoted as "Br". "B" indicates that it is a B picture that is not referred to by other pictures, and "Br" indicates that it is a B picture that is referred to by other pictures.

The basic video stream St1 and the first enhancement video stream St2 explained above are transmitted from the transmission-side (encoding-side) to the reception-side (decoding-side). At the reception-side, image data S-60 of 60 fps can be obtained by decoding the basic video stream St1. At the reception-side, both of the basic video stream St1 and the first enhancement video stream St2 are decoded and combined, so that image data S-120 of 120 fps can be obtained.

Figure 8:
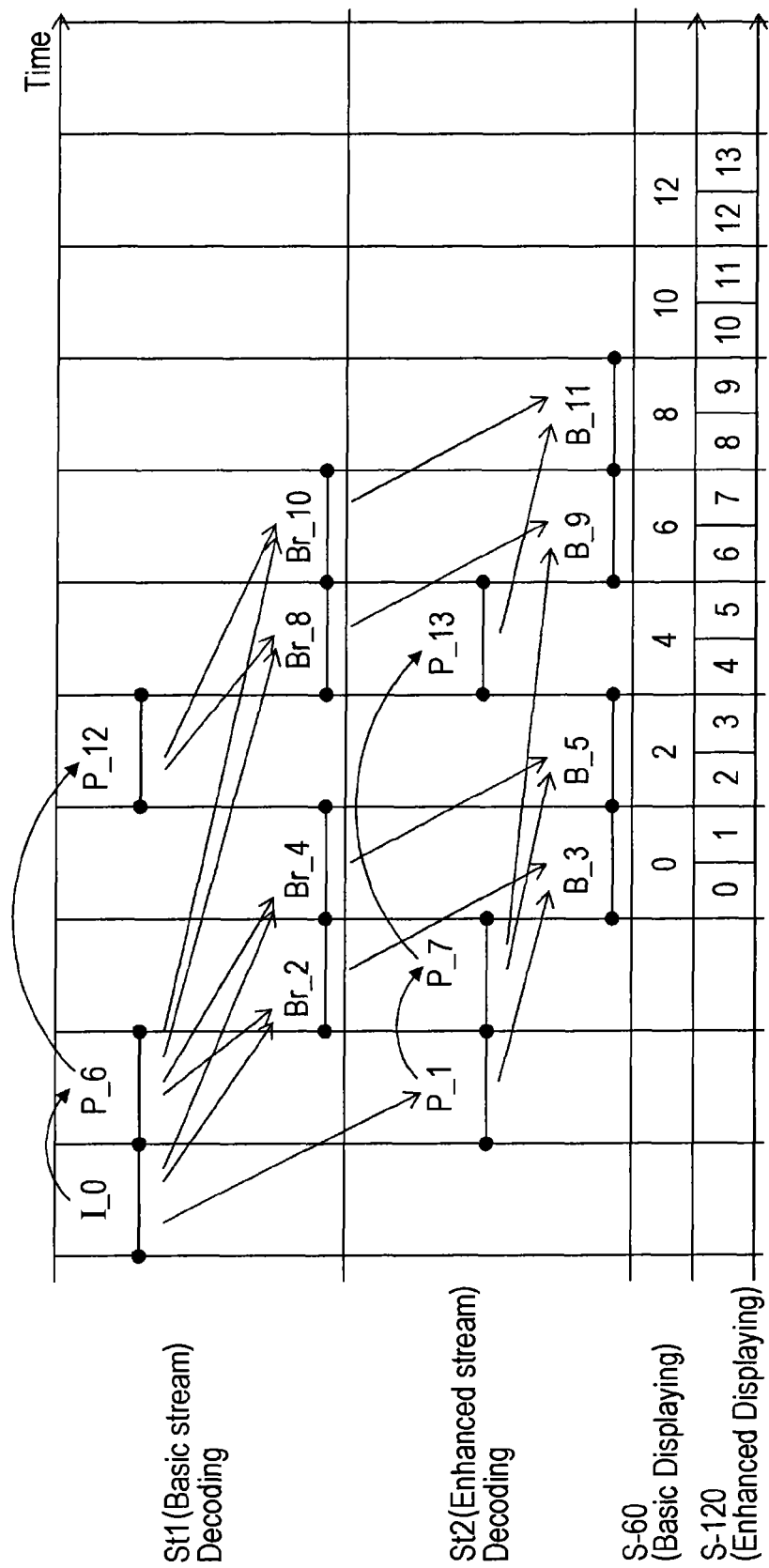
FIG. 8 is a figure illustrating an example of decoding in a case where a basic video stream and a first enhancement video stream are transmitted.

FIG. 8 is a figure illustrating an example of decoding in a case where the basic video stream St1 and the first enhancement video stream St2 are transmitted. The decoding processing is performed on the basic video stream St1 in the following order: the I picture of the 0-th frame (I_0), the P picture of the 6-th frame (P_6), the B picture of the 2-nd frame (Br_2), and then the B picture of the 4-th frame (Br_4) . . . . The arrows in the drawing show the reference relationship of the pictures. The basic video stream St1 is thus decoded, so that image data S-60 of 60 fps can be obtained.

The decoding processing is performed on the first enhancement video stream St2 in the following order: the P picture of the 1-st frame (P_1), the P picture of the 7-th frame (P_7), the B picture of the 3-rd frame (B_3), and then, the B picture of the 5-th frame (B_5) . . . . The arrows in the drawing show the reference relationship of the pictures. Not only the basic video stream St1 is decoded but also the first enhancement video stream St2 is decoded as described above, so that image data S-120 of 120 fps can be obtained.

Figure 9:
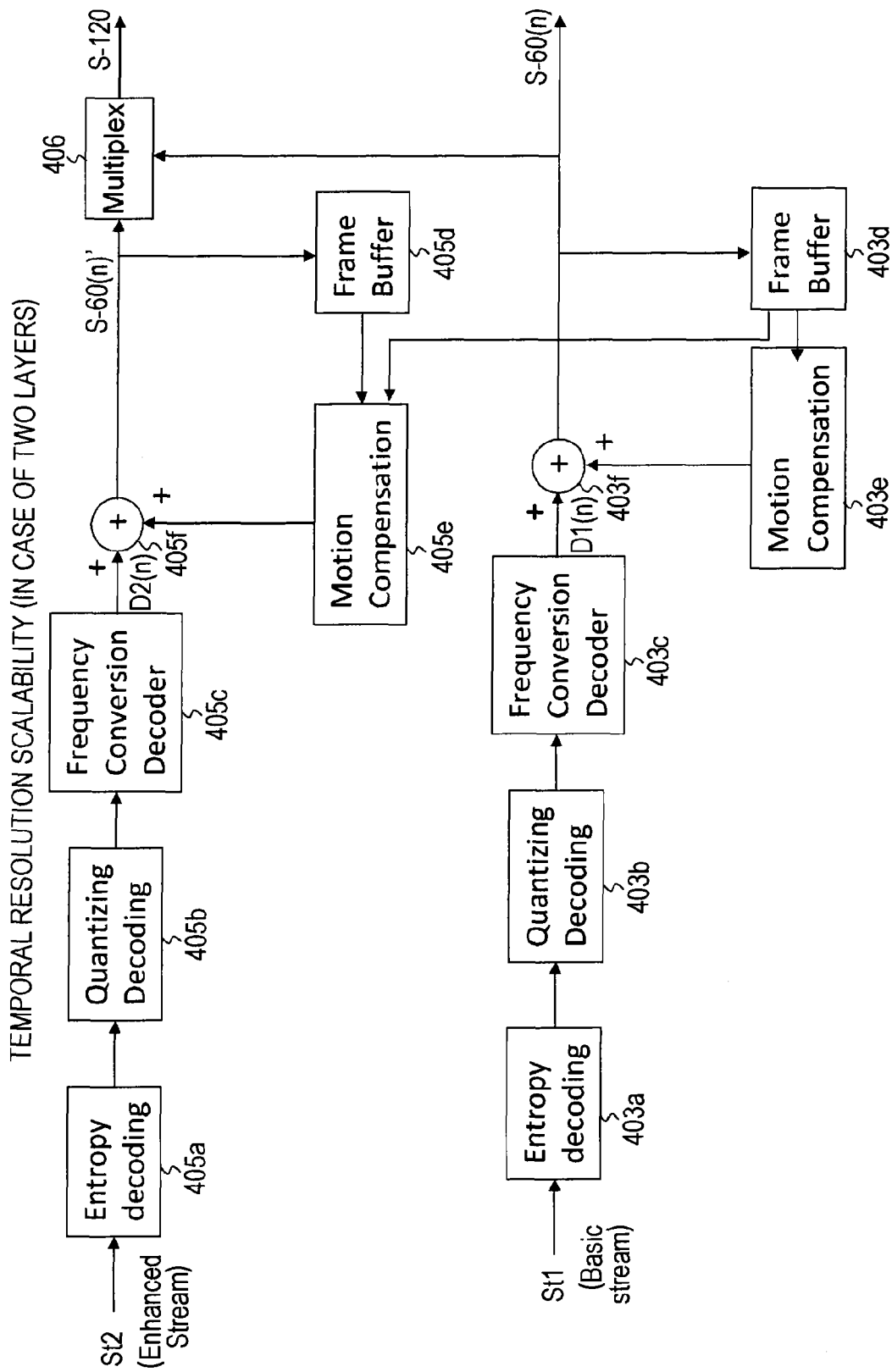
FIG. 9 is a figure illustrating an example of specific configuration of temporal resolution scalability at a reception-side (decoding-side).

FIG. 9 illustrates an example of specific configuration of temporal resolution scalability at the reception-side (decoding-side). This example of configuration shows a case where there are two layers (the first class, the second class). An entropy decoding unit 403a performs entropy decode processing on the basic video stream St1, and a quantizing decoding unit 403b performs inverse-quantizing processing on the basic video stream St1. Further, a frequency conversion decoder 403c processes the inverse-quantized data to change the data from frequency axis data back to temporal axis data, thus obtaining decoded data D1 (n) of the current frame.

An adder 403f adds image data of the reference picture obtained from the frame buffer 403d, which has been processed in the motion compensation processing performed by a motion compensation unit 403e, to the decoded data D1 (n). Then, this adder 403f provides image data S-60(n) of 60 fps of the current frame.

An entropy decoding unit 405a performs entropy decode processing on the first enhancement video stream St2, and a quantizing decoding unit 405b performs inverse-quantizing processing on the first enhancement video stream St2. Further, a frequency conversion decoder 405c processes the inverse-quantized data to change the data from frequency axis data back to temporal axis data, thus obtaining decoded data D2 (n) of the current frame.

An adder 405*f* adds image data of the reference picture obtained from the frame buffer 403*d* and the frame buffer 405*d*, which has been processed in the motion compensation processing performed by a motion compensation unit 405*e*, to the decoded data D2(*n*). This adder 405*f* provides image data S-60(*n*)' of 60 fps of the current frame. Then, a combining unit 406 combines the image data S-60(*n*)' of 60 fps with the image data S-60(*n*) of 60 fps explained above, so that image data S-120 of 120 fps are obtained.

One or more video streams (video sub-streams) are inserted into one or more video elementary streams and transmitted. More specifically, the transport stream TS includes one or more video elementary streams. When the basic video stream and a predetermined number of enhancement video streams are inserted into a single video elementary stream and transmitted, a single access unit (access unit) includes pictures of all the streams.

Figure 10:
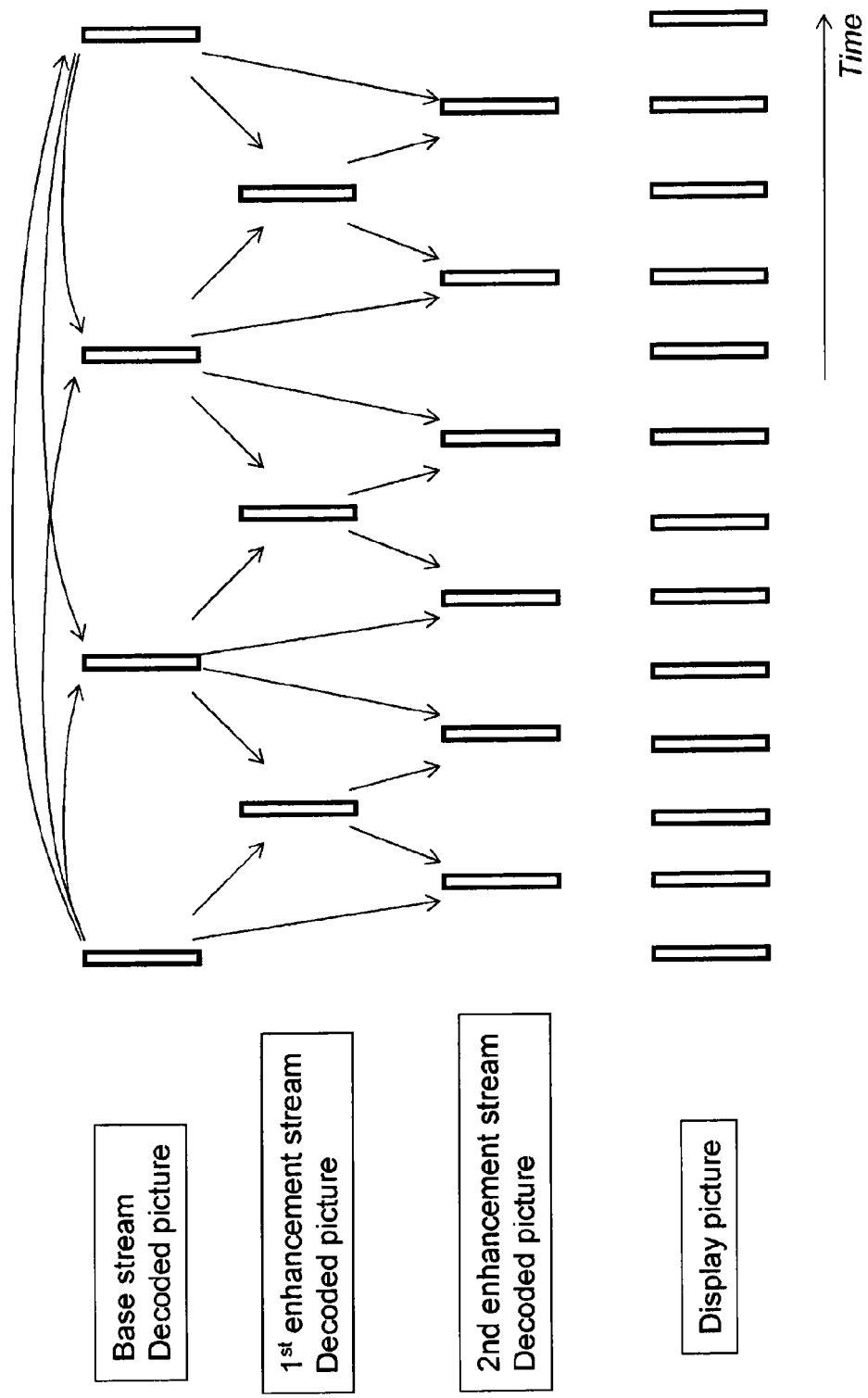
FIG. 10 is a figure illustrating an example of decoding process of temporal resolution scalability.

FIG. 10 is a figure illustrating an example of decoding process of temporal resolution scalability. Arrows in FIG. 10 denote directions in which pictures are referred to. In this example, there is a basic video stream (Base stream) including the image data in the first class (the lowest class). In this example, there are a first enhancement video stream (1st enhancement stream) including image data in the second class and a second enhancement video stream (2nd enhancement stream) including image data in the third class. Then, in this example, the frame display frequency of the basic video stream is increased two times with the first enhancement video stream, and is further increased two times with the second enhancement video stream.

In this example, between the basic video stream and the first enhancement video stream, the picture insertion in the enhancement layer (Enhanced layer) has one picture. Between the first enhancement video stream and the second enhancement video stream, the picture insertion in the enhancement layer (Enhanced layer) has one picture.

Each picture of the basic video stream is decoded by referring to only a picture in this basic video stream. Each picture of the first enhancement video stream is decoded by referring to a picture in the basic video stream. Each picture of the second enhancement video stream is decoded by referring to pictures in the basic video stream and the first enhancement video stream.

As described above, the basic video stream, the first enhancement video stream, and the second enhancement video stream are decoded, and ultimately, image data are obtained with a display frequency four times higher than the frame display frequency of the basic video stream.

Figure 11:
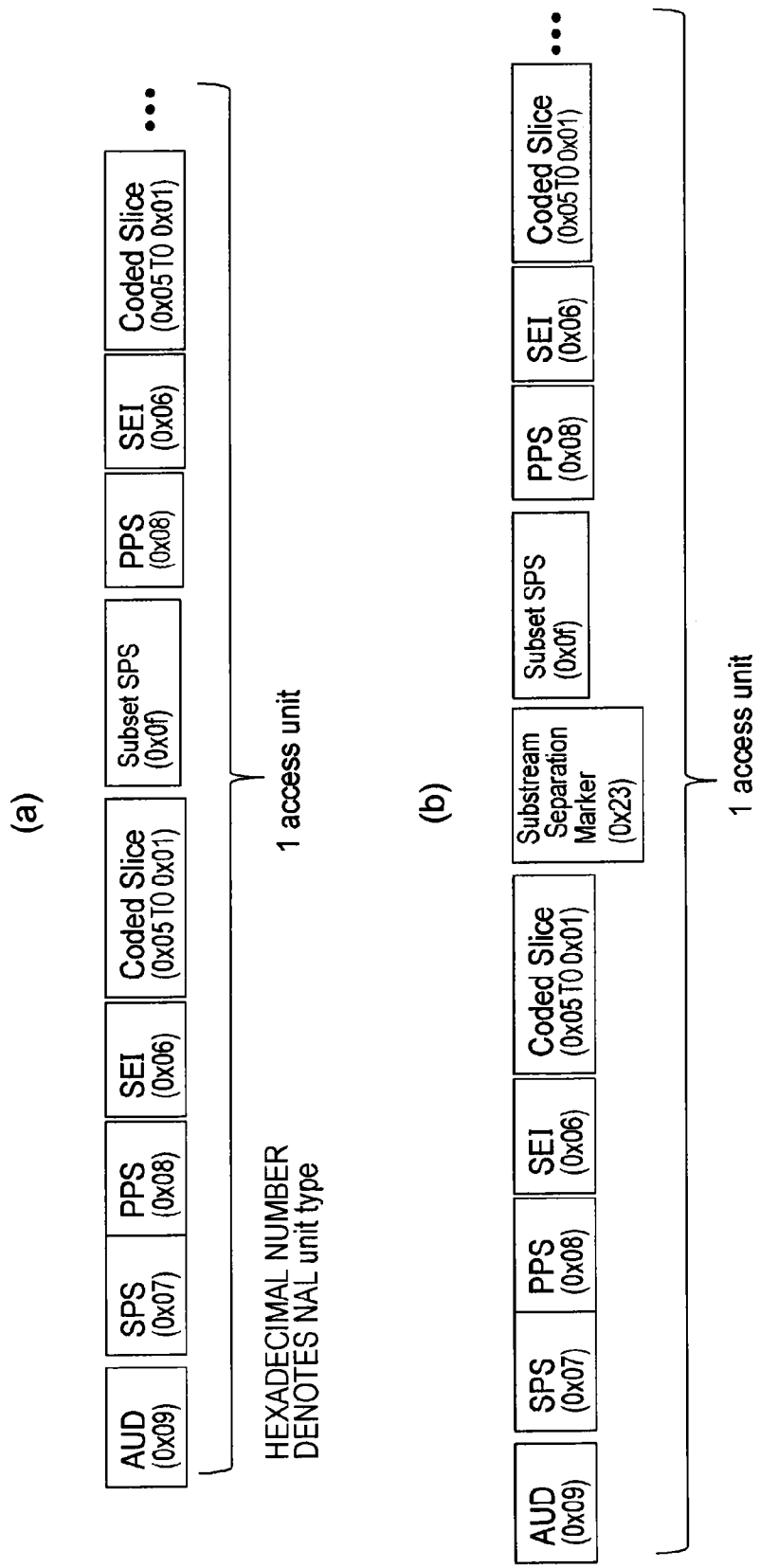
FIGS. 11(a) and 11(b) are figures illustrating examples of video elementary streams including encoded data of pictures of multiple video streams (sub-streams).

FIGS. 11(*a*) and 11(*b*) illustrate examples of video elementary streams including encoded data of pictures of multiple video streams (sub-streams). In each access unit, encoded data of pictures of each sub-stream are arranged in order. In this case, the encoded data of the picture of the first sub-stream are constituted by "SPS to Coded Slice". The encoded data of the picture of the second and subsequent sub-streams are constituted by "Subset SPS to Coded Slice". In this example, coding according to MPEG4-AVC is applied. However, other encoding methods can also be applied. It should be noted that a hexadecimal number in the figures denote a "NAL unit type".

When encoded data of pictures of sub-streams coexist in a single video elementary stream, the border between pictures is required to be identified instantly. However, the AUD (access unit delimiter) can be added to only the head of a single access unit. Therefore, as shown in FIG. 11(*b*), it may be possible to define and arrange a new "NAL unit" indicating a border, "Substream Separation Marker", between the encoded data of the pictures of the sub-streams.

Therefore, the data at the head of the pictures of each sub-stream can be accessed instantly. FIG. 11(*a*) illustrates an example where "Substream Separation Marker" is not arranged between the encoded data of the pictures of the sub-streams.

Figure 12:
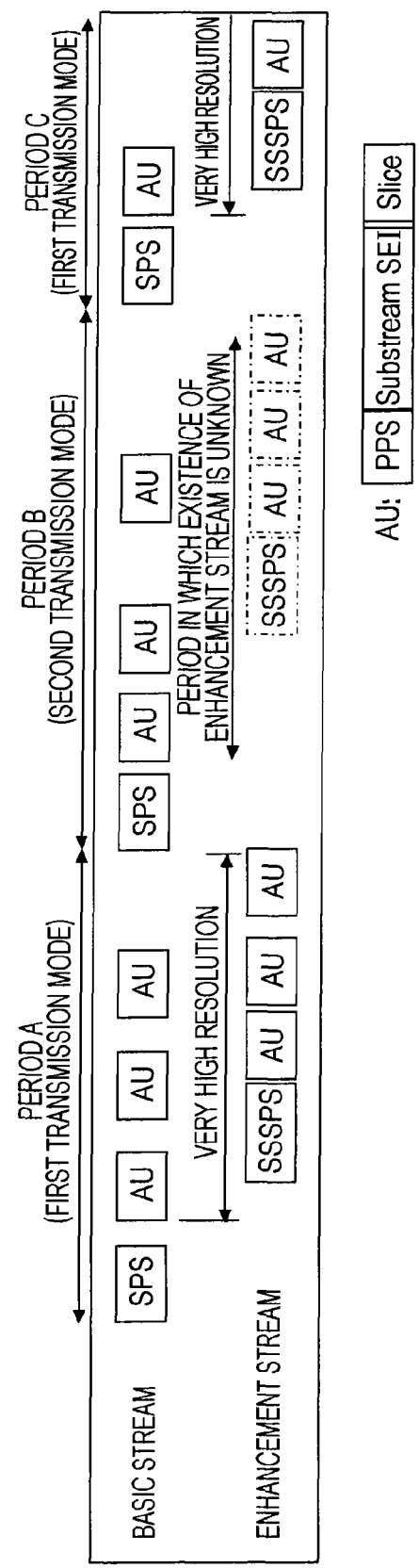
FIG. 12 is a figure illustrating an example in a case where a first transmission mode and a second transmission mode are arranged to be continuous alternately and where identification information (signaling) for mode identification is not given.

FIG. 12 illustrates an example in a case where a first transmission mode and a second transmission mode are arranged to be continuous alternately and where identification information (signaling) for mode identification is not given. Period A and period C represent periods in the first transmission mode. Period B represents a period in the second transmission mode. Each period represents, for example, a program unit or a scene unit.

The period of the first transmission mode includes not only the basic video stream but also an enhancement video stream for attaining spatially or temporary very high resolution. The period of the second transmission mode includes only the basic video stream. In the basic video stream, the SPS is arranged at the head of the basic video stream, and a predetermined number of access units (AUs) are arranged subsequently. In the enhancement video stream, a subset SPS (SSSPS) is arranged at the head of the enhancement video stream, and a predetermined number of access unit (AU) are arranged subsequently. The access unit (AU) is constituted by "PPS, Substream SEIs, Coded Slice".

When any enhancement video stream is not provided to the reception buffer of the receiver at a point in time of switching from the period A to the period B, the receiver cannot determine whether it is taking more time for the stream to reach the receiver because of a reason due to the encoder or the transmission path, or the encoder stops encoding the enhancement video stream and providing only the basic video stream. In this case, the buffer at the receiver may have to wait more than necessary, and as a result, an underflow (underflow) may occur.

In such case, at the discretion of the receiver, for example, comparison is performed with a timeout time which is set in advance, and the receiver may, for example, change the display mode from that for the very high resolution image to the display mode of basic image (conventional image). However, when such determination is made by the receiver, it takes a processing time to perform the determination, which makes is impossible to instantly make determination. More specifically, the receiver cannot perform correct stream reception to appropriately cope with the change in the stream configuration and more specifically to appropriately cope with the dynamic change in the distribution content.

In order to avoid such situation, it may be necessary to provide a mode identification information (signaling) in synchronization with switching of the transmission mode, thus allowing the receiver to detect the signal and instantly determine the point in time for switching the transmission mode. In this embodiment, the identification information for identifying the first transmission mode and the second transmission mode into a video stream.

Figure 13:
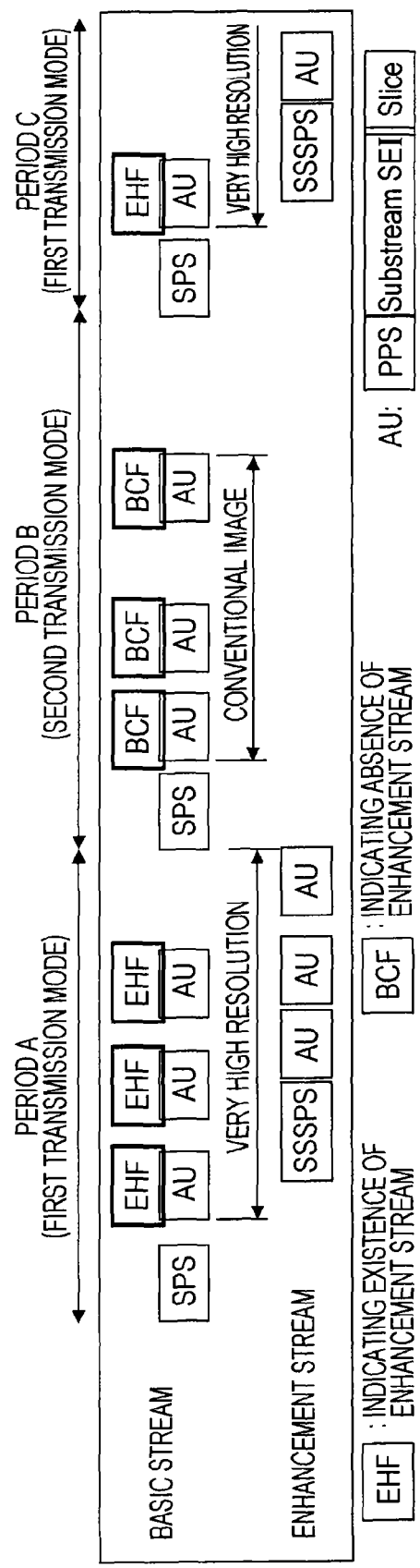
FIG. 13 is a figure for explaining an example in a case where identification information is inserted into a video stream according to "method 1".

The identification information is inserted according to, for example, a "method 1", a "method 2", or a "method 3" explained below. As shown in FIG. 13, in the "method 1", the identification information "EHF" indicating the first transmission mode is inserted into the video stream, or identification information "BCF" indicating the second transmission mode (absence of enhancement video stream) is inserted thereto. More specifically, in the first transmission mode, the identification information "EHF" is inserted into the video stream, and in the second transmission mode, the identification information "BCF" is inserted into the video stream.

Figure 14:
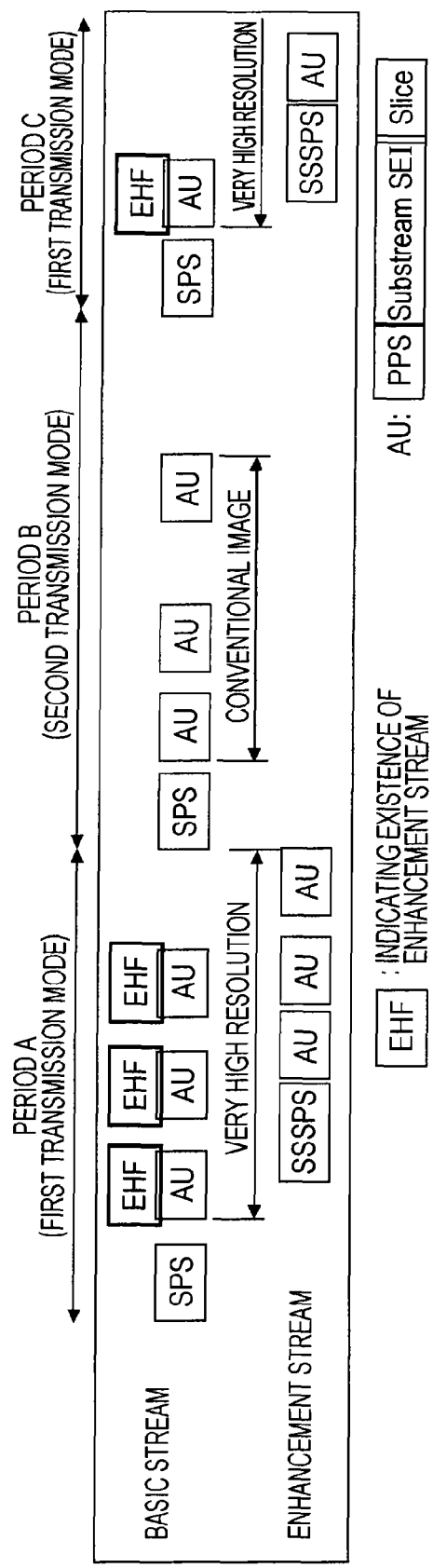
FIG. 14 is a figure for explaining an example in a case where identification information is inserted into a video stream according to "method 2".

As shown in FIG. 14, in the "method 2", the identification information "EHF" indicating the first transmission mode (presence of enhancement video stream) is inserted into the video stream. More specifically, in the first transmission mode, the identification information "EHF" is inserted into the video stream, and in the second transmission mode, the identification information is not inserted into the video stream.

Figure 15:
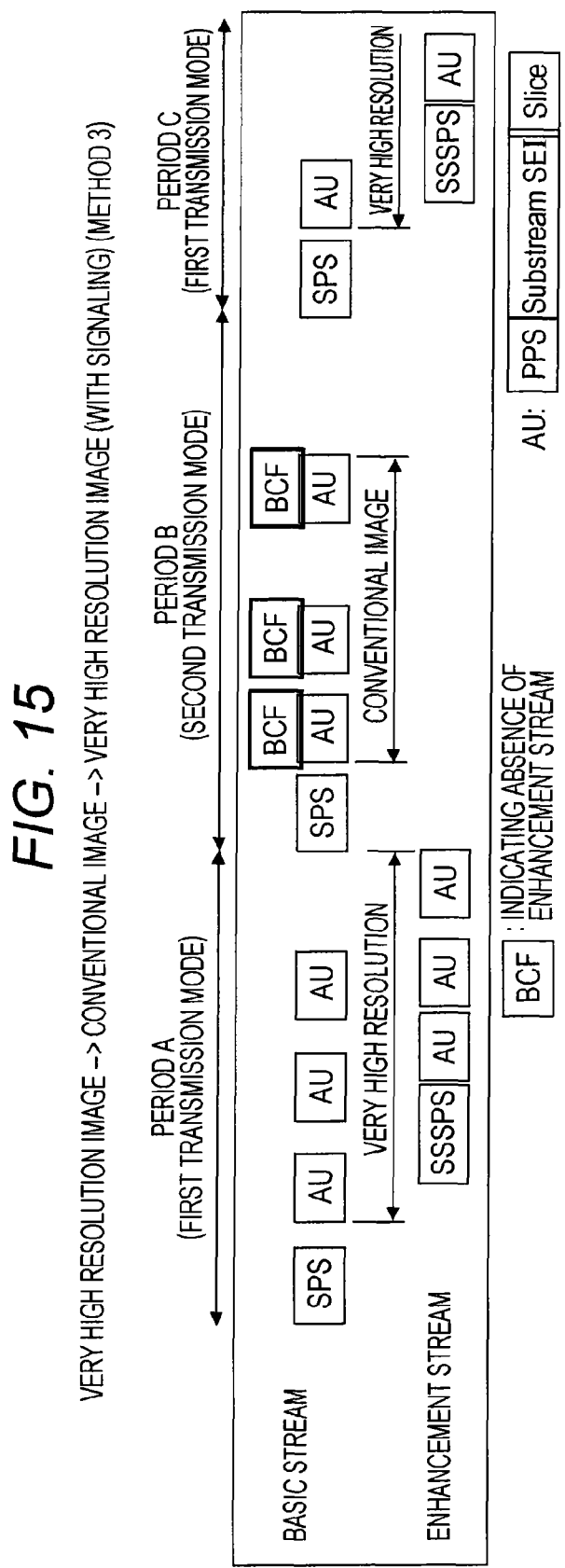
FIG. 15 is a figure for explaining an example in a case where identification information is inserted into a video stream according to "method 3".

As shown in FIG. 15, in the "method 3", the identification information "BCF" indicating the second transmission mode is inserted into the video stream. More specifically, in the first transmission mode, the identification information is not inserted into the video stream, and in the second transmission mode, the identification information "BCF" is inserted into the video stream.

In the case of the first transmission mode and more specifically in the case of the identification information "EHF", this identification information includes information indicating the number of enhancement video streams, information indicating the type of scalability enhancement, information indicating the scaling ratio for combining with an upper class in scalability enhancement, and the like.

This identification information is inserted into, for example, user data area of a sequence header or a picture header of a video stream. This identification information is inserted in at least a program unit, a scene unit, a picture group unit, or a picture unit. The examples shown in FIGS. 13, 14 and 15 explained above shows an example where the identification information is inserted in a picture unit.

As described above, the identification information of the transmission mode is inserted into the video stream, so that the reception-side can appropriately switch the display processing of very high resolution images and the display processing of conventional images in accordance with the switching of the transmission mode. When the display processing of conventional images is performed, resolution increasing processing is performed. The details of the identification information ("EHF", "BCF") will be explained later.

In addition, the identification information for identifying whether the mode is the first transmission mode or the second transmission mode is inserted into the layer of the transport stream TS. This identification information is arranged at the optimum position in an event unit or in a temporally static or dynamic use case. For example, this identification information is inserted under a video elementary loop (Video ES loop) of a program map table (PMT) included in the transport stream TS. With this identification information, the reception-side can roughly determine whether the mode is the first transmission mode or the second transmission mode without decoding the video stream.

When the identification information indicates the first transmission mode, the identification information includes information indicating the number of enhancement video streams, information indicating the type of scalability enhancement, information indicating whether a predetermined number of enhancement video streams are provided in a single video elementary stream or not, and the like. The details of this identification information will be explained later.

In addition, the identification information for identifying the number of video elementary streams into which one or more video streams (sub-streams) are inserted is inserted into the layer of the transport stream TS. This identification information is arranged at the optimum position in an event unit or in a temporally static or dynamic use case. For example, this identification information is inserted under a program loop (Program_loop) of a program map table (PMT) included in the transport stream TS. With this identification information, the reception-side can determine the number of video elementary streams to be decoded. The details of this identification information will be explained later.

The receiver 200 receives a transport stream TS transmitted from the broadcast station 100 in such a manner that the transport stream TS is carried by a broadcast wave. In the period of the first transmission mode, the receiver 200 decodes video streams (the basic video stream and a predetermined number of enhancement video streams) included in the transport stream TS, and obtains display image data of very high resolution images. In the period of the second transmission mode, the receiver 200 decodes the video stream included in this transport stream TS (basic video stream), and obtains the display image data of conventional images.

"Example of Configuration of Transmission Data Generation Unit"

Figure 16:
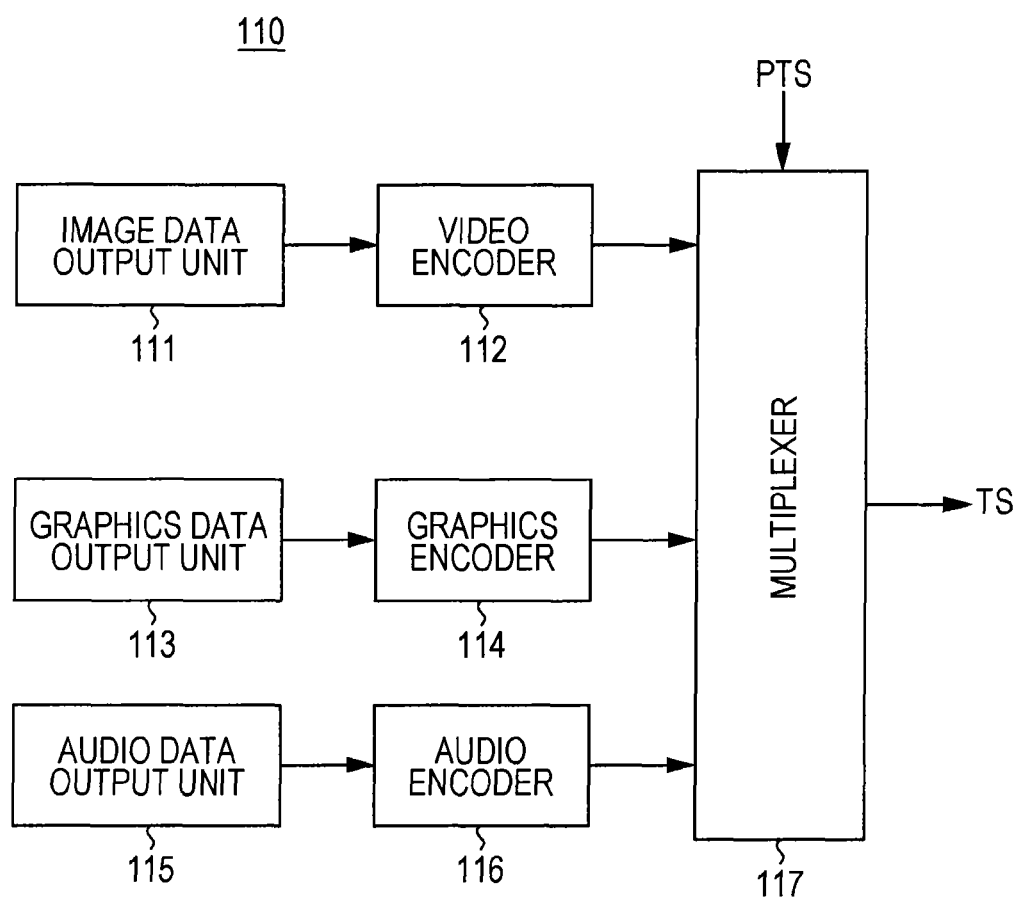
FIG. 16 is a block diagram illustrating an example of configuration of a transmission data generation unit configured to generate a transport stream in a broadcast station.

FIG. 16 illustrates an example of configuration of a transmission data generation unit 110 generating the transport stream TS explained above in the broadcast station 100. This transmission data generation unit 110 includes an image data output unit 111, a video encoder 112, a graphics data output unit 113, a graphics encoder 114, an audio data output unit 115, an audio encoder 116, and a multiplexer 117.

First, a case of the first transmission mode will be explained. The image data output unit 111 outputs image data of spatially or temporally very high resolution image. This image data output unit 111 includes, for example, a camera for capturing an image of a subject and outputting image data and an image data reading unit for reading image data from a storage medium and outputting the image data. The image data correspond to, for example, 4K image data, 8K image data, and the like, for displaying spatially very high resolution images. Alternatively, the image data correspond to, for example, image data of 120 fps, image data of 240 fps, and the like, for displaying temporally very high resolution images.

The video encoder 112 performs scalable encoding processing on the image data which are output from the image data output unit 111, and generates a basic video stream (sub-stream) including image data in the lowest class and a predetermined number of enhancement video streams (sub-streams) each including image data in classes other than the lowest layer. Each video stream (sub-stream) is encoded according to, for example, MPEG4-AVC, MPEG2video, and the like. Then, the video encoder 112 generates one or more video elementary stream having the basic video stream and a predetermined number of enhancement video streams inserted thereto using a stream formatter (not shown) provided in a later stage.

When the "method 1" or the "method 2" explained above are employed, the video encoder 112 inserts the identification information "EHF" indicating the first transmission mode into the basic video stream. This identification information "EHF" includes information indicating the number of enhancement video streams, information indicating the type of scalability enhancement, information indicating the scaling ratio for combining with an upper class in scalability enhancement, and the like.

Figure 17:
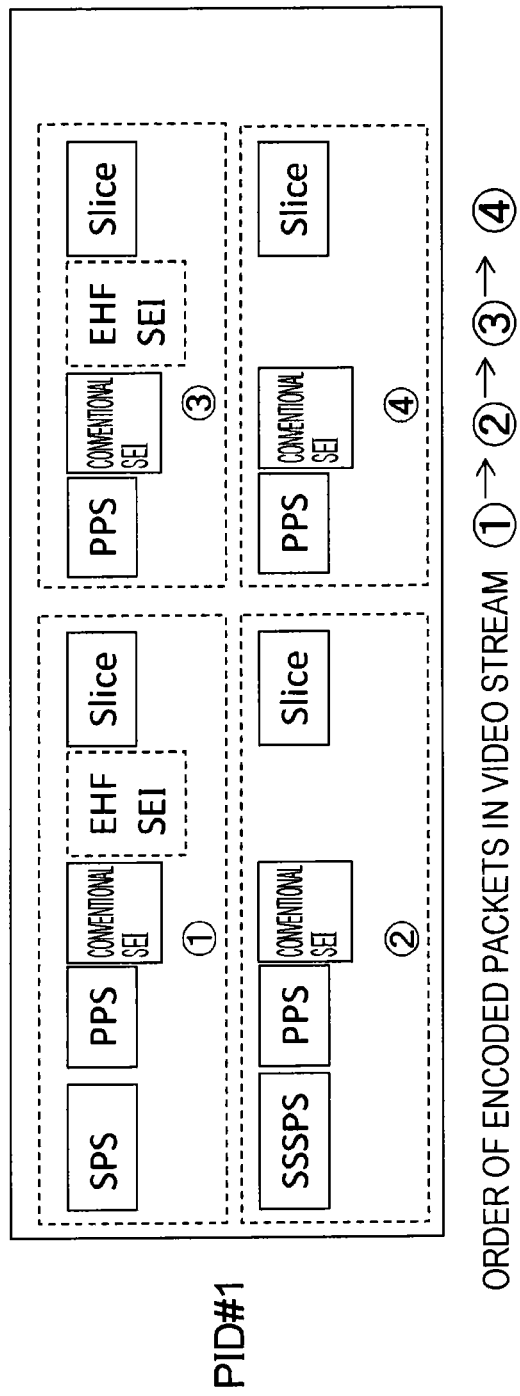
FIG. 17 is a figure illustrating encoded packet order in a stream in a case where a basic video stream and a predetermined number of enhancement video streams are inserted into a single video elementary stream (Single PID).

FIG. 17 illustrates encoded packet order in a stream in a case where a basic video stream and a predetermined number of enhancement video streams are inserted into a single video elementary stream (Single PID). This example shows a case where there is a single enhancement video stream. The identification information "EHF" is inserted into the basic video stream as an SEI message, the details of which will be explained later.

FIG. 18 illustrates encoded packet order in each stream in a case where each video stream including a basic video stream and a predetermined number of enhancement video streams are inserted into a single video elementary stream (Multiple PID). This example shows a case where there is a single enhancement video stream.

Back to FIG. 16, the graphics data output unit 113 outputs data of graphics superimposed on an image (also including subtitle which are printed translation of foreign language). The graphics encoder 114 generates a graphics stream including graphics data which are output from the graphics data output unit 113 (graphics elementary stream). In this case, the graphics constitute superimposed information, and are, for example, logos, subtitles, and the like.

The graphics data are mainly bitmap data. The graphics data are attached with offset information indicating the superimposing position on the image. This offset information indicates, for example, offset values in the vertical direction and the horizontal direction from the point of origin at the upper left of the image to the upper left pixel of the superimposing position of the graphics. It should be noted that the standard of transmission of subtitle data as bitmap data is standardized and operated as, for example, "DVB_Subtitling" in DVB which is a digital broadcast specification in Europe.

The audio data output unit 115 outputs audio data corresponding to image data. This audio data output unit 115 includes, for example, a microphone, or an audio data reading unit which reads audio data from a storage medium and outputs the audio data. The audio encoder 116 applies encoding such as MPEG-2 Audio, AAC, and the like to the audio data which are output from the audio data output unit 115, and generates an audio stream (audio elementary stream).

The multiplexer 117 packetizes and multiplexes each elementary stream generated by the video encoder 112, the graphics encoder 114, and the audio encoder 116, thus generating a transport stream TS. In this case, a PTS (Presentation Time Stamp) is inserted into the header of each PES (Packetized Elementary Stream) for synchronized play back at the reception-side.

The multiplexer 117 inserts identification information for identifying whether the mode is the first transmission mode or the second transmission mode into the layer of the transport stream TS. In this case, this identification information indicates the first transmission mode. This identification information is inserted under the video elementary loop (Video ES loop) of the program map table (PMT) included in the transport stream TS, for example.

This multiplexer 117 inserts, into the layer of the transport stream TS, the identification information for identifying the number of video elementary streams into which one or more video streams (sub-streams) are inserted. In this case, this identification information indicates "1" or "the number of enhancement video streams+1". This identification information is inserted under the program loop (Program_loop) of the program map table (PMT) included in the transport stream TS, for example.

Subsequently, a case of the second transmission mode will be explained. The image data output unit 111 outputs image data of conventional image, for example, HD image. The video encoder 112 applies encoding such as MPEG4-AVC, MPEG2video, and the like to image data which are output from the image data output unit 111, and generates the basic video stream (sub-stream). Then, the video encoder 112 generates a single video elementary stream having the basic video stream inserted thereto using a stream formatter (not shown) provided in a later stage.

When the "method 1" or the "method 3" explained above are employed, the video encoder 112 inserts the identification information "BCF" indicating the second transmission mode into the basic video stream.

Although the detailed explanations are omitted, the graphics data output unit 113, the graphics encoder 114, the audio data output unit 115, and the audio encoder 116 operate in the same manner as the first transmission mode.

The multiplexer 117 packetizes and multiplexes each elementary stream generated by the video encoder 112, the graphics encoder 114, and the audio encoder 116, thus generating a transport stream TS. In this case, a PTS (Presentation Time Stamp) is inserted into the header of each PES (Packetized Elementary Stream) for synchronized play back at the reception-side.

The multiplexer 117 inserts identification information for identifying whether the mode is the first transmission mode or the second transmission mode into the layer of the transport stream TS. In this case, this identification information indicates the second transmission mode. This identification information is inserted under the video elementary loop (Video ES loop) of the program map table (PMT) included in the transport stream TS, for example.

This multiplexer 117 inserts, into the layer of the transport stream TS, the identification information for identifying the number of video elementary streams into which one or more video streams (sub-streams) are inserted. In this case, this identification information indicates "1". This identification information is inserted under the program loop (Program_loop) of the program map table (PMT) included in the transport stream TS, for example.

The operation of the transmission data generation unit 110 as shown in FIG. 16 will be briefly explained. First, a case of the first transmission mode will be explained. The image data of spatially or temporally very high resolution image which are output from the image data output unit 111 are provided to the video encoder 112.

This video encoder 112 applies scalable encoding processing on the image data, and generates the basic video stream (sub-stream) including the image data in the lowest class and a predetermined number of enhancement video streams (sub-streams) including image data in classes other than the lowest layer. Then, the video encoder 112 generates one or more video elementary streams into which the basic video stream and the predetermined number of enhancement video streams are inserted. This video elementary stream is provided to the multiplexer 117. When the "method 1" or the "method 2" explained above are employed, this video encoder 112 inserts the identification information "EHF" indicating the first transmission mode into the basic video stream (see FIGS. 13 and 14).

The graphics data which are output from the graphics data output unit 113 (also including subtitle data) are provided to the graphics encoder 114. This graphics encoder 114 generates a graphics stream including graphics data (graphics elementary stream). This graphics stream is provided to the multiplexer 115.

The audio data which are output from the audio data output unit 115 are provided to the audio encoder 116. This audio encoder 116 applies encoding such as MPEG-2 Audio, AAC, and the like to the audio data, thus generating an audio stream (an audio elementary stream). This audio stream is provided to the multiplexer 117.

The multiplexer 117 packetizes and multiplexes the elementary stream provided by each encoder, thus generating a transport stream TS. In this case, a PTS is inserted into each PES header for synchronized play back at the reception-side. The multiplexer 117 inserts, under the video elementary loop (Video ES loop) of the PMT, the identification information for identifying whether the mode is the first transmission mode or the second transmission mode. The multiplexer 117 inserts, under the program loop of the PMT, the identification information for identifying the number of video elementary streams.

Subsequently, a case of the second transmission mode will be explained. The image data of conventional image, for example, HD image, which are output from the image data output unit 111 are provided to the video encoder 112. This video encoder 112 applies encoding such as MPEG4-AVC, MPEG2video, and the like to the image data, thus generating a basic video stream (sub-stream). Then, this video encoder 112 generates a single video elementary stream into which the basic video stream is inserted. When the "method 1" or the "method 3" explained above are employed, this video encoder 112 inserts the identification information "BCF" indicating the second transmission mode into the basic video stream (see FIGS. 13 and 15).

The multiplexer 117 packetizes and multiplexes each elementary stream generated by the video encoder 112, the graphics encoder 114, and the audio encoder 116, thus generating a transport stream TS. In this case, a PTS is inserted into each PES header for synchronized play back at the reception-side. For example, the multiplexer 117 inserts, under the video elementary loop (Video ES loop) of the PMT, the identification information for identifying whether the mode is the first transmission mode or the second transmission mode. For example, the multiplexer 117 inserts, under the program loop of the PMT, the identification information for identifying the number of video elementary streams.

[Structure of Each Identification Information and TS Configuration]

As described above, the identification information for identifying the first transmission mode and the second transmission mode ("EHF", "BCF") is inserted into the video stream. For example, when the encoding method is MPEG4-AVC, or when the encoding method is an encoding method of which encoding structure such as NAL packet is similar such as HEVC, this identification information is inserted to the portion of "SEIs" of the access unit (AU) as an SEI message (Enhancement scalability SEI message).

FIG. 19(a) illustrates an access unit at the head of the GOP (Group Of Pictures). FIG. 19(b) illustrates an access unit other than at the head of the GOP. When the identification information ("EHF", "BCF") is inserted in GOP unit, "Enhancement scalability SEI message" is inserted to only the access unit at the head of the GOP. In the drawing, SEI messages other than "Enhancement scalability SEI message" correspond to portions described as "conventional SEI" in FIGS. 17 and 18 explained above.

FIG. 20(a) illustrates an example of configuration (Syntax) of "Enhancement scalability SEI message". "uuid_iso_iec_11578" has a UUID value indicated in "ISO/IEC 11578:1996 Annex A.". "userdata_for_enhancement_scalability_data( )" is inserted into the field of "user_data_payload_byte". FIG. 20(b) illustrates an example of configuration (Syntax) of "userdata_for_enhancement_scalability_data( )". In this configuration, enhancement scalability data (enhancement_scalability_data( )) is inserted. "userdata_id" is an identifier of enhancement scalability data indicated by unsigned 16 bits.

FIG. 21 illustrates an example of configuration (Syntax) of enhancement scalability data (enhancement_scalability_data( )). FIG. 22 illustrates contents of main information in the example of structure of enhancement scalability data (Semantics).

A two-bit field "enhancement_scalability_type" indicates the type of scalability enhancement. For example, "00" indicates non-scalable. "01" indicates spatial resolution scalability. "10" indicates temporal resolution scalability. In the case of the identification information "EHF" indicating the first transmission mode, this two-bit field is, for example, "01" or "10". In the case of the identification information "BCF" indicating the second transmission mode, this two-bit field is "00". Therefore, this two-bit field allows identification as to whether the mode is the first transmission mode or the second transmission mode.

A three-bit field "number_of_enhanced_streams" indicates the number of enhancement video streams. For example, "000" indicates zero stream. "001" indicates one stream. "010" indicates two stream. "011" indicates three streams. In a case of the identification information "EHF" indicating the first transmission mode, this three-bit field indicates one or more streams. On the other hand, in a case of the identification information "BCF" indicating the second transmission mode, this three-bit field indicates zero stream.

When the two-bit field "enhancement_scalability_type" indicates the spatial resolution scalability, there are as many three-bit fields "spatial_scaling_ratio" as the number of enhancement video streams. This three-bit field indicates a spatial scaling ratio for combining with a decoded picture (image) in an immediately above enhancement layer (enhancement layer), and represents a combination of a horizontal pixel rate and a vertical pixel rate for scaling a decoded picture of a lower layer (lower layer) (see FIG. 6).

For example, "000" means not-scaling. "001" indicates the upscaling ratios in both of the horizontal and vertical directions are 50% (enlarging by 3/2 times). "010" indicates the upscaling ratios in both of the horizontal and vertical directions are 100% (enlarging by 2 times). Further, "011" indicates the upscaling ratios in both of the horizontal and vertical directions are 150% (enlarging by 5/2 times).

When the two-bit field "enhancement_scalability_type" indicates a temporal resolution scalability, there are as many three-bit fields "temporal_scaling_ratio" as the number of enhancement video streams. This three-bit field indicates a temporal scaling ratio for combining with a decoded picture in an immediately above enhancement layer (enhancement layer), and indicates the number of pictures in the enhancement layer (enhanced layer) displayed between decoded pictures (images) in the lower layer (lower layer) (see FIG. 10).

For example, "000" indicates there is no picture insertion in the enhancement layer. "001" indicates the picture insertion in the enhancement layer includes one picture. "010" indicates the picture insertion in the enhancement layer includes two pictures. "011" indicates the picture insertion in the enhancement layer includes three pictures.

As described above, the identification information for identifying whether the mode is the first transmission mode or the second transmission mode is inserted under the video elementary loop (Video ES loop) of the program map table (PMT) of the transport stream TS, for example. FIG. 23 indicates an example of configuration (Syntax) of scalable enhancement descriptor (Scalable_enhancement_descriptor) serving as this identification information. FIG. 24 illustrates contents of main information in the example of structure (Semantics).

This scalable enhancement descriptor is inserted only in the case of, for example, the first transmission mode. Therefore, when the descriptor exists, this allows for identifying that the mode is the first transmission mode in the layer of the transport stream TS, and on the contrary, when the descriptor does not exist, this allows for identifying that the mode is the second transmission mode in the layer of the transport stream TS.

An eight-bit field "scalable_enhancement_tag" indicates a descriptor type, and in this case, the eight-bit field "scalable_enhancement_tag" indicates a scalable enhancement descriptor. An eight-bit field "scalable_enhancement_length" indicates the length (size) of the descriptor, and indicates the number of subsequent bytes, which is the length of the descriptor.

A two-bit field "Scalable_enhancement_type" indicates the type of scalability enhancement. For example, "01" indicates spatial resolution scalability. "10" indicates temporal resolution scalability.

One-bit field "stream_delivery_type" indicates a video elementary stream configuration providing basic and enhancement video streams. "1" indicates each video stream is provided in a single video elementary stream. "0" indicates each video stream is provided in multiple video elementary streams.

A three-bit field "number_of_enhanced_streams" indicates the number of enhancement video streams. For example, "000" indicates zero stream. "001" indicates one stream. "010" indicates two streams. "011" indicates three streams.

As described above, the identification information for identifying the number of video elementary streams into which one or more video streams (sub-streams) are inserted is inserted under the program loop (Program_loop) of the program map table (PMT) of the transport stream TS, for example. FIG. 25(a) illustrates an example of configuration of multiple stream descriptor (Multiple_stream_descriptor) serving as this identification information (Syntax).

An eight-bit field "multiple_stream_tag" indicates a descriptor type, and in this case, the eight-bit field "multiple_stream_tag" indicates a multiple stream descriptor. The eight-bit field "multiple_stream_length" indicates a length (size) of descriptor, and indicates the number of subsequent bytes, which is the length of the descriptor.

A three-bit field "number_of_video_streams" indicates the number of video elementary streams. For example, as shown in FIG. 25(b), "001" indicates one stream. "010" indicates two streams. "011" indicates three streams. "100" indicates four streams. In the case of the first transmission mode, this three-bit field indicates one or more streams. On the other hand, in the case of the second transmission mode, this three-bit field indicates only one stream.

Figure 26:
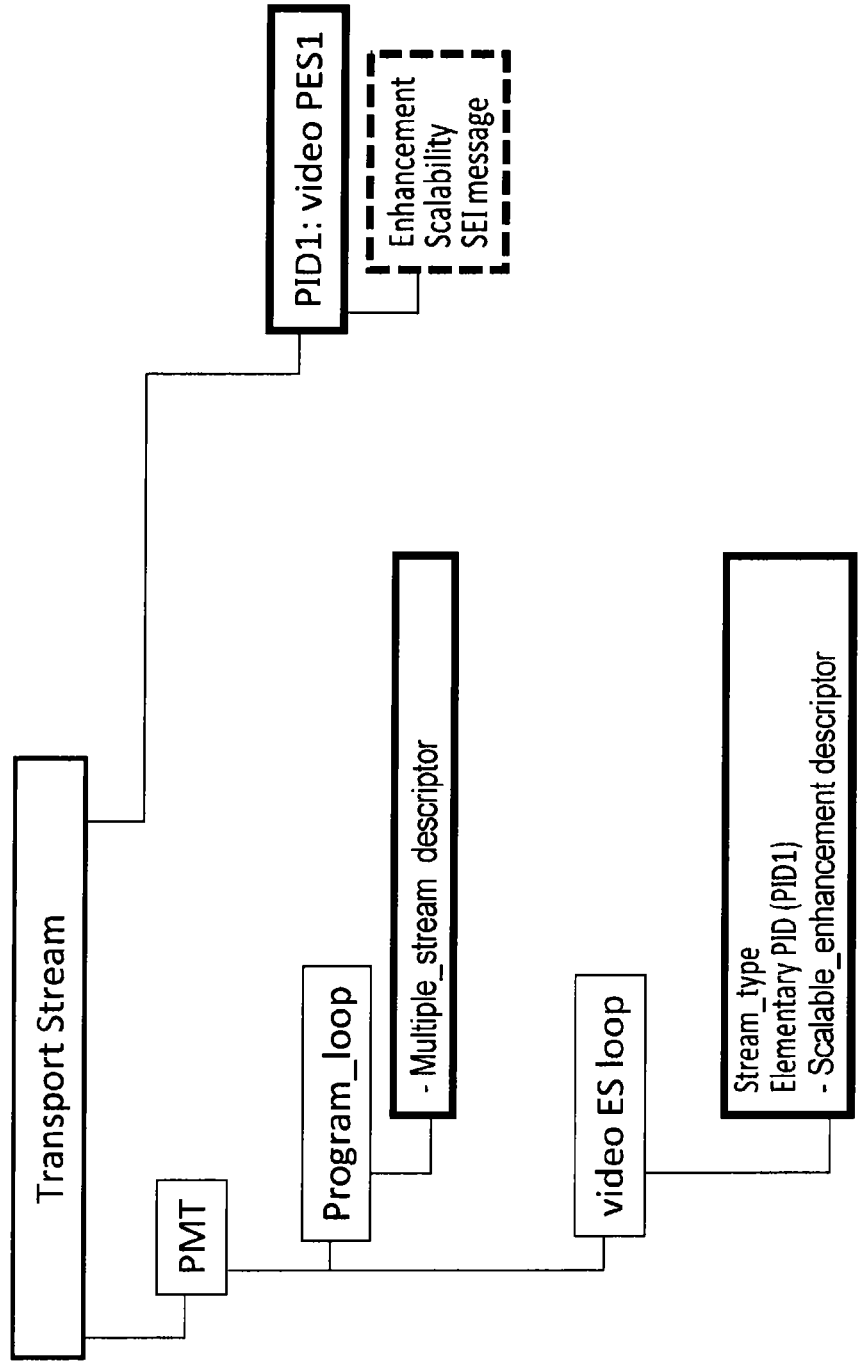
FIG. 26 is a figure illustrating an example of configuration of TS in a case where there is only one video elementary stream into which video streams (sub-streams) are inserted (Single PID).

FIG. 26 illustrates an example of configuration of a transport stream TS. In this example, in order to simplify the drawing, portions related to audio and graphics are omitted from the drawing. This example shows a case where only the basic video stream or the basic video stream and a predetermined number of enhancement video streams are inserted into a single video elementary stream and transmitted (Single PID). More specifically, in the first transmission mode, the basic video stream and the predetermined number of enhancement video streams are inserted into this single video elementary stream, and in the second transmission mode, only the basic video stream is inserted into this single video elementary stream.

The transport stream TS includes a PES packet "PID1: video PES1" of a single video elementary stream. The identification information for identifying the first transmission mode and the second transmission mode ("EHF", "BCF") is inserted into the basic video stream (sub-stream) inserted into this video elementary stream as an SEI message (Enhancement scalability SEI message) (see FIG. 21).

The transport stream TS includes a PMT (Program Map Table) as a PSI (Program Specific Information). This PSI is information describing which program each elementary stream included in the transport stream belongs to.

In the PMT, there is an elementary loop having information related to each elementary stream. In this example of configuration, there is a video elementary loop (Video ES loop). In this video elementary loop, information such as a stream type and a packet identifier (PID) is arranged in association with the single video elementary stream described above, and a descriptor describing information related to the video elementary stream is also arranged therein.

Under the video elementary loop (Video ES loop) of the PMT, a scalable enhancement descriptor (Scalable_enhancement_descriptor) is inserted in association with the single video elementary stream described above (see FIG. 23). Under the program loop (Program loop) of the PMT, a multiple stream descriptor (Multiple_stream_descriptor) is inserted (see FIG. 25). It should be noted that the scalable enhancement descriptor is inserted only in the case of, for example, the first transmission mode as explained above.

Figure 27:
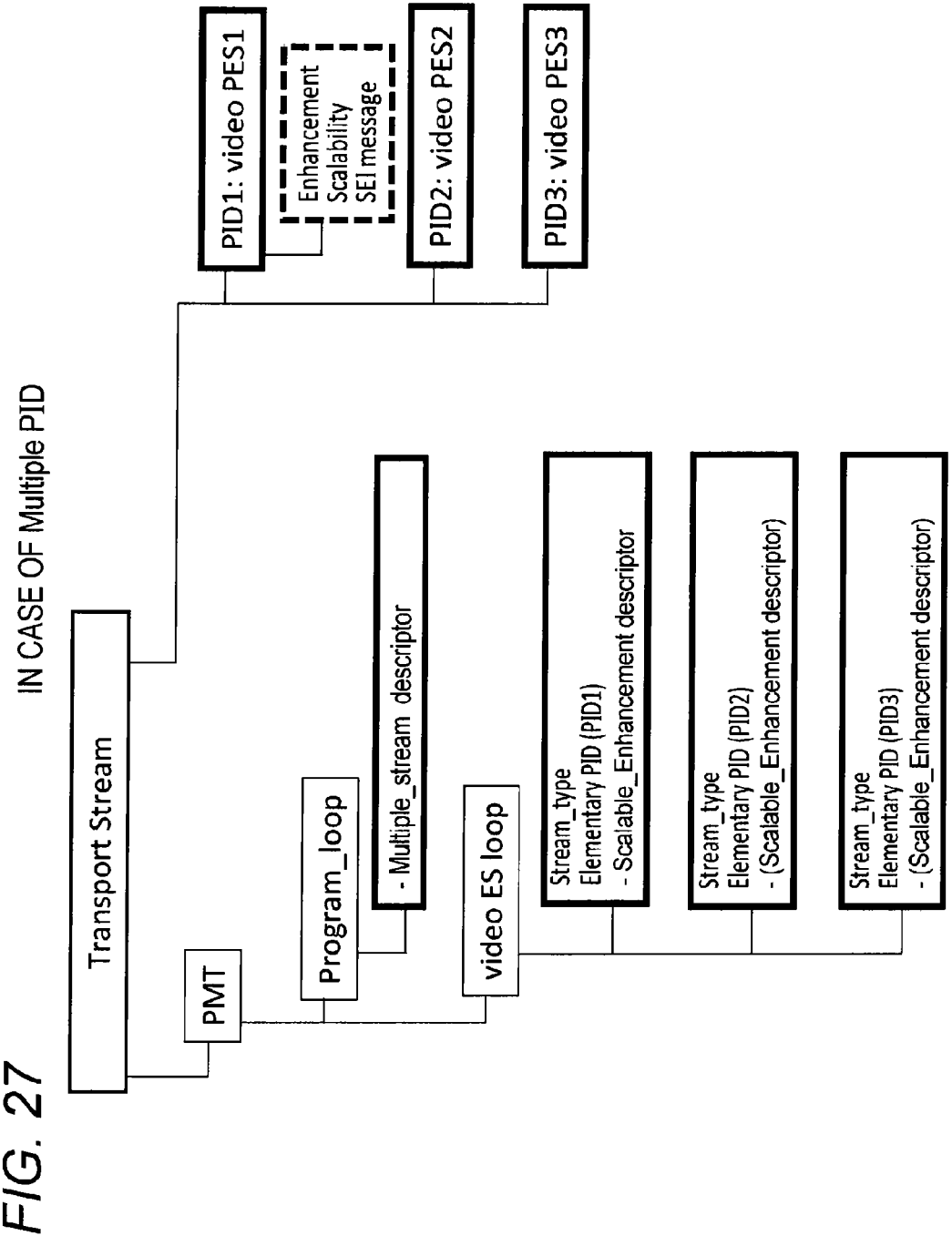
FIG. 27 is a figure illustrating an example of configuration of TS in a case where there are multiple video elementary streams into which video streams (sub-streams) are inserted (Multiple PID).

FIG. 27 also illustrates an example of configuration of a transport stream TS. In this example, in order to simplify the drawing, portions related to audio and graphics are also omitted from the drawing. This example shows a case where the basic video stream and a predetermined number of enhancement video streams are inserted into different video elementary streams and transmitted (Multiple PID). This example shows a case where there are two enhancement video streams.

This example of configuration includes a PES packet "PID1: video PES1" of a video elementary stream into which the basic video stream (sub-stream) is inserted. The identification information for identifying the first transmission mode and the second transmission mode ("EHF", "BCF") is inserted into this basic video stream as an SEI message (Enhancement scalability SEI message) (see FIG. 21).

This example of configuration includes a PES packet "PID2:video PES2" of a video elementary stream into which the first enhancement video stream (sub-stream) is inserted and a PES packet "PID3:video PES3" of a video elementary stream into which the second enhancement video stream (sub-stream) is inserted.

The transport stream TS includes a PMT (Program Map Table) as a PSI (Program Specific Information). This PSI is information describing which program each elementary stream included in the transport stream belongs to.

In the PMT, there is an elementary loop having information related to each elementary stream. In this example of configuration, there is a video elementary loop (Video ES loop). In this video elementary loop, information such as a stream type and a packet identifier (PID) is arranged for each video elementary stream, and a descriptor describing information related to the video elementary stream is also arranged therein.

Under the video elementary loop (Video ES loop) of the PMT, the scalable enhancement descriptor (Scalable_enhancement_descriptor) of the same content is inserted in association with each of the video elementary streams described above (see FIG. 23). The scalable enhancement descriptor (Scalable_enhancement_descriptor) may be inserted only in association with the video elementary stream into which the basic video stream is inserted. Under the program loop (Program loop) of the PMT, a multiple stream descriptor (Multiple_stream_descriptor) is inserted (see FIG. 25). It should be noted that the scalable enhancement descriptor is inserted only in the case of, for example, the first transmission mode as explained above.

"Example of Configuration of Receiver"

FIG. 28 illustrates an example of configuration of a receiver 200. This receiver 200 includes a CPU 201, a flash ROM 202, a DRAM 203, an internal bus 204, a remote control reception unit (an RC reception unit) 205, and a remote control transmitter (RC transmitter) 206. This receiver 200 includes an antenna terminal 211, a digital tuner 212, a transport stream buffer (TS buffer) 213, and a demultiplexer 214.

This receiver 200 includes a coded buffer 215, a video decoder 216, a basic stream decoded buffer 217, an enhancement stream decoded buffer 218, a combining processing unit 219, a video RAM 220, a resolution increasing processing unit 221, and a superimposing unit 2222. This receiver 200 includes a coded buffer 231, a graphics decoder 232, a pixel buffer 233, a scaler 234, a coded buffer 241, an audio decoder 242, and a channel mixing unit 243.

The CPU 201 controls operation of each unit of the receiver 200. The flash ROM 202 stores control software and holds data. The DRAM. 203 constitutes a work area for the CPU 201. The CPU 201 extracts software and data which are read from the flash ROM 202 to the DRAM 203 to activate the software, thus controlling each unit of the receiver 200. The RC reception unit 205 receives a remote control signal (remote control code) transmitted from the RC transmitter 206, and provides the remote control signal (remote control code) to the CPU 201. The CPU 201 controls each unit of the receiver 200 on the basis of the remote control code. The CPU 201, the flash ROM 202, and the DRAM 203 are connected to the internal bus 204.

The antenna terminal 211 is a terminal for inputting a television broadcast signal received by a reception antenna (not shown). The digital tuner 212 processes a television broadcast signal which is input into the antenna terminal 211, and outputs a predetermined transport stream (bit stream data) TS corresponding to the user selected channel. The transport stream buffer (TS buffer) 213 temporarily accumulates the transport stream TS which is output from the digital tuner 212.

This transport stream TS includes one or more video elementary streams, a graphics elementary stream, and an audio elementary stream. In the first transmission mode and the second transmission mode, the following sub-streams are inserted into one or more video elementary streams.

More specifically, in the first transmission mode, the basic video stream and a predetermined number of enhancement video streams are inserted. In this case, the basic video stream includes the image data in the lowest class constituting the scalable encoded image data (image data of spatially or temporally very high resolution image). Each of the predetermined number of enhancement video streams includes image data in classes other than the lowest class constituting the scalable encoded image data. In the second transmission mode, only the basic video stream is inserted into this transport stream TS. In this case, the basic video stream includes image data of conventional image (for example, HD resolution, 25 fps, 30 fps images and the like) which serve as basic image data.

An SEI message (Enhancement scalability SEI message) serving as the identification information for identifying the first transmission mode and the second transmission mode ("EHF", "BCF") is inserted into the basic video stream (see FIG. 21). A scalable enhancement descriptor (Scalable_enhancement_descriptor) serving as the identification information for identifying whether the mode is the first transmission mode or the second transmission mode is inserted into the layer of the transport stream TS (see FIG. 23). Further, a multiple stream descriptor (Multiple_stream_descriptor) serving as the identification information for identifying the number of video elementary streams is inserted into the layer of the transport stream TS (see FIG. 25).

The demultiplexer 214 extracts each elementary stream of video, graphics, and audio from the transport stream TS temporarily accumulated in the TS buffer 213. The demultiplexer 214 extracts the scalable enhancement descriptor and the multiple stream descriptor from this transport stream TS, and sends them to the CPU 201.

The CPU 201 controls processing such as decoding in the receiver 200 on the basis of information included in the descriptors. For example, the CPU 201 performs control so as to decode the scalable enhancement descriptors under the video elementary loop (Video ES loop) and the video elementary streams (PES streams) associated therewith for the number of video elementary streams included in the multiple stream descriptor.

The coded buffer 215 temporarily accumulates one or more video elementary streams extracted by the demultiplexer 214. Under the control of the CPU 201, the video decoder 216 retrieves and decodes one or more video streams (sub-streams) inserted into the video elementary stream stored in the coded buffer 215.

In the first transmission mode, the basic video stream and the predetermined number of enhancement video streams are retrieved and decoded. In this case, the image data in the lowest class constituting the scalable encoded image data (for example, image data of HD resolution, 25 fps, 30 fps images, and the like) are obtained by decoding the basic video stream. The image data in classes other than the lowest class constituting scalable encoded image data are obtained by decoding each of the predetermined number of enhancement video streams. In the second transmission mode, only the basic video stream is retrieved and decoded. In this case, image data of conventional image (for example, HD resolution, 25 fps, 30 fps images, and the like) are obtained by decoding the basic video stream.

The video decoder 216 extracts an SEI message (Enhancement scalability SEI message) inserted into the basic video stream, and sends the SEI message to the CPU 201. On the basis of not only presence/absence of the scalable enhancement descriptor explained above but also the mode information in the SEI message, the CPU 201 identifies whether the mode is the first transmission mode or the second transmission mode, and controls each unit of the receiver 200 so as to perform processing according to each mode. For example, when the CPU 201 determines mode-switching in the layer of the transport stream TS on the basis of presence/absence of the scalable enhancement descriptor, the CPU 201 switches the processing when the mode-switching is identified on the basis of the mode information in the SEI message thereafter.

The basic stream decoded buffer 217 temporarily accumulates the image data obtained when the video decoder 216 decodes the basic video stream. In the first transmission mode, the image data are image data in the lowest class constituting the scalable encoded image data, and in the second transmission mode, the image data are image data of conventional image. The enhancement stream decoded buffer 218 temporarily accumulates each piece of image data obtained when the video decoder 216 decodes the predetermined number of enhancement video streams. The image data is obtained only in the first transmission mode, and are image data in classes other than the lowest class constituting the scalable encoded image data.

The combining processing unit 219 performs processing only in the first transmission mode. This combining processing unit 219 performs combining processing for combining image data in the lowest class stored in the basic stream decoded buffer 217 and image data in classes other than the lowest class stored in the enhancement stream decoded buffer 218, thus generating display image data Va of very high resolution image (see FIGS. 6 and 10). In this case, the combining processing unit 219 refers to information such as a scaling ratio included in the SEI message (Enhancement scalability SEI message) in accordance with the type of the scalability enhancement, and performs the combining processing of the spatial resolution scalability or the temporal resolution scalability.

The resolution increasing processing unit 221 performs processing only in the second transmission mode. This resolution increasing processing unit 221 performs resolution increasing processing on image data of conventional image stored in the basic stream decoded buffer 217, and generates display image data Vb having a resolution equivalent to the resolution of the display image data Va of the very high resolution image explained above. In this case, in the case of the spatial resolution scalability, the increasing processing is performed to increase the spatial resolution, and in the case of the temporal resolution scalability, the increasing processing is performed to increase the frame frequency.

In the first transmission mode, the video RAM 220 temporarily accumulates the image data Va generated by the combining processing unit 219. In the second transmission mode, the video RAM 220 temporarily accumulates the image data Vb generated by the resolution increasing processing unit 221.

The coded buffer 231 temporarily accumulates the graphics stream extracted by the demultiplexer 214. The graphics decoder 232 performs processing opposite to the graphics encoder 114 (see FIG. 16) of the transmission data generation unit 110 explained above. More specifically, the graphics decoder 232 performs decoding processing to decode the graphics stream stored in the coded buffer 231, thus obtaining decoded graphics data (including subtitle data). The graphics decoder 232 generates bitmap data of graphics superimposed on the image data on the basis of the graphics data.

The pixel buffer 233 temporarily accumulates the bitmap data of graphics generated by the graphics decoder 232. The scaler 234 adjusts the size of the bitmap data of the graphics accumulated in the pixel buffer 233 so that it corresponds to the size of the display image data. The superimposing unit 222 superimposes the bitmap data of the scaled graphics onto the display image data Va, Vb stored in the video RAM 220, thus obtaining ultimate display image data.

The coded buffer 241 temporarily accumulates the audio stream extracted by the demultiplexer 214. The audio decoder 242 performs processing opposite to the audio encoder 116 of the transmission data generation unit 110 explained above (see FIG. 16). More specifically, the audio decoder 242 performs decoding processing of the audio stream stored in the coded buffer 241, thus obtaining decoded audio data. The channel mixing unit 243 obtains audio data of each channel for realizing, e.g., 5.1 ch surround sound and the like from the audio data obtained by the audio decoder 242.

It should be noted that the reading of the image data from the basic stream decoded buffer 217 and the enhancement video stream decoded buffer 218 and the reading of the bitmap data of the graphics from the pixel buffer 233 are performed on the basis of the PTS, and transfer synchronization is established.

The operation of the receiver 200 will be explained. First, a case of the first transmission mode will be explained. The television broadcast signal which is input into the antenna terminal 211 is provided to the digital tuner 212. This digital tuner 212 processes the television broadcast signal, and outputs a predetermined transport stream TS corresponding to a user selected channel. This transport stream TS is temporarily accumulated in the TS buffer 213.

This transport stream TS includes one or more video elementary streams, a graphics elementary stream, and an audio elementary stream. The basic video stream and a predetermined number of enhancement video stream are inserted to the one or more video elementary streams.

The demultiplexer 214 extracts each elementary stream of video, graphics and audio from the transport stream TS temporarily stored in the TS buffer 213. The demultiplexer 214 extracts scalable enhancement descriptor (Scalable_enhancement_descriptor) and multiple stream descriptor (Multiple_stream_descriptor) from this transport stream TS, and sends the scalable enhancement descriptor (Scalable_enhancement_descriptor) and the multiple stream descriptor (Multiple_stream_descriptor) to the CPU 201. The CPU 201 controls processing such as decoding in the receiver 200 on the basis of information included in the descriptors.

The one or more video elementary streams extracted by the demultiplexer 214 are provided to the coded buffer 215 and temporarily accumulated therein. Under the control of the CPU 201, the video decoder 216 retrieves and decodes one or more video streams (sub-streams) inserted into the video elementary stream stored in the coded buffer 215.

In this case, the basic video stream and the predetermined number of enhancement video streams are retrieved and decoded. The image data in the lowest class constituting the scalable encoded image data (for example, image data of HD resolution, 25 fps, 30 fps images, and the like) are obtained by decoding the basic video stream. The image data in classes other than the lowest class constituting scalable encoded image data are obtained by decoding each of the predetermined number of enhancement video streams.

The video decoder 216 extracts an SEI message (Enhancement scalability SEI message) inserted into the basic video stream, and sends the SEI message to the CPU 201. On the basis of not only presence/absence of the scalable enhancement descriptor explained above but also the mode information in the SEI message, the CPU 201 identifies whether the mode is the first transmission mode or the second transmission mode. In this case, the CPU 201 identifies that the mode is the first transmission mode, and controls each unit of the receiver 200 so as to perform processing in accordance with this first transmission mode.

The image data in the lowest class constituting the scalable encoded image data obtained by the video decoder 216 are temporarily accumulated in the basic stream decoded buffer 217. The image data in classes other than the lowest class constituting the scalable encoded image data obtained by the video decoder 216 are temporarily accumulated in the enhancement stream decoded buffer 218.

The combining processing unit 219 performs combining processing for combining image data in the lowest class stored in the basic stream decoded buffer 217 and image data in classes other than the lowest class stored in the enhancement stream decoded buffer 218. Then, this combining processing unit 219 generates display image data Va of very high resolution image. This display image data Va are temporarily accumulated in the video RAM 220.

The graphics stream extracted by the demultiplexer 214 is provided to the coded buffer 231 to be temporarily accumulated therein. The graphics decoder 232 performs decoding processing of the graphics stream stored in the coded buffer 231, and obtains decoded graphics data (including subtitle data). The graphics decoder 232 generates bitmap data of graphics superimposed on the image data on the basis of the graphics data.

The bitmap data of graphics generated by the graphics decoder 232 are provided to the pixel buffer 233 to be temporarily accumulated therein. The scaler 234 adjusts the size of the bitmap data of the graphics accumulated in the pixel buffer 233 so that it corresponds to the size of the display image data Va. The superimposing unit 222 superimposes the bitmap data of the scaled graphics onto the display image data Va stored in the video RAM 220, thus obtaining ultimate display image data. By providing the display image data to a display, spatially or temporally very high resolution images are displayed.

The audio stream extracted by the demultiplexer 214 is provided to the coded buffer 241 and temporarily accumulated therein. The audio decoder 242 performs decoding processing to decode the audio stream stored in the coded buffer 241, thus obtaining decoded audio data. The audio data are provided to the channel mixing unit 243. The channel mixing unit 243 obtains audio data of each channel for realizing, e.g., 5.1 ch surround sound and the like from the audio data. The audio data are provided to, for example, a speaker, and the audio is output in synchronization with the image display.

Subsequently, a case of the second transmission mode will be explained. The television broadcast signal which is input into the antenna terminal 211 is provided to the digital tuner 212. This digital tuner 212 processes the television broadcast signal, and outputs a predetermined transport stream TS corresponding to the user selected channel. This transport stream TS is temporarily accumulated in the TS buffer 213.

This transport stream TS includes a single video elementary stream, a graphics elementary stream, and an audio elementary stream. The basic video stream is inserted into the single video elementary stream.

The demultiplexer 214 extracts each elementary stream of video, graphics and audio from the transport stream TS temporarily stored in the TS buffer 213. The demultiplexer 214 extracts multiple stream descriptor (Multiple_stream_descriptor) from this transport stream TS, and sends the multiple stream descriptor (Multiple_stream_descriptor) to the CPU 201. The CPU 201 controls processing such as decoding in the receiver 200 on the basis of information included in the descriptors.

The single video elementary stream extracted by the demultiplexer 214 is provided to the coded buffer 215 and temporarily accumulated therein. Under the control of the CPU 201, the video decoder 216 retrieves and decodes the basic video stream (sub-stream) inserted into the video elementary stream stored in the coded buffer 215. As a result of this decoding, the image data of conventional image (for example, HD resolution, 25 fps, 30 fps images, and the like) are obtained. The image data are temporarily accumulated in the basic stream decoded buffer 217.

The video decoder 216 extracts an SEI message (Enhancement scalability SEI message) inserted into the basic video stream, and sends the SEI message to the CPU 201. On the basis of not only presence/absence of the scalable enhancement descriptor explained above but also the mode information in the SEI message, the CPU 201 identifies whether the mode is the first transmission mode or the second transmission mode. In this case, the CPU 201 identifies that the mode is the second transmission mode, and controls each unit of the receiver 200 so as to perform processing in accordance with this second transmission mode.

The resolution increasing processing unit 221 performs resolution increasing processing on image data of conventional image stored in the basic stream decoded buffer 217, and generates display image data Vb having a resolution equivalent to the resolution of the display image data Va of the very high resolution image explained above. In this case, in the case of the spatial resolution scalability, the increasing processing is performed to increase the spatial resolution, and in the case of the temporal resolution scalability, the increasing processing is performed to increase the frame frequency.

The graphics stream extracted by the demultiplexer 214 is provided to the coded buffer 231 to be temporarily accumulated therein. The graphics decoder 232 performs decoding processing of the graphics stream stored in the coded buffer 231, and obtains decoded graphics data (including subtitle data). The graphics decoder 232 generates bitmap data of graphics superimposed on the image data on the basis of the graphics data.

The bitmap data of graphics generated by the graphics decoder 232 are provided to the pixel buffer 233 to be temporarily accumulated therein. The scaler 234 adjusts the size of the bitmap data of the graphics accumulated in the pixel buffer 233 so that it corresponds to the size of the display image data Vb. The superimposing unit 222 superimposes the bitmap data of the scaled graphics onto the display image data Vb stored in the video RAM 220, thus obtaining ultimate display image data. By providing the display image data to a display, the images obtained by applying the resolution increasing processing to the conventional images are displayed.

It should be noted that the operation of the audio system is the same as the case of the first transmission mode, and the explanation thereabout is omitted.

[Switching Control of Reception Processing when Switching Between High-Precision Program and Conventional Program]

Now, switching of reception processing in the receiver 200 when switching between a high-precision program and a conventional program will be explained. In this case, the high-precision program is transmitted in the first transmission mode, but the conventional program is transmitted in the second transmission mode.

FIG. 29 illustrates an example of switching control of reception processing. In this example, in the first transmission mode, the basic video stream and a predetermined number of enhancement video streams are inserted into a single video elementary stream and are provided. In this case, the basic video stream includes the image data (HD image data) in the lowest class (first class), and the predetermined number of enhancement video streams include image data in classes other than the lowest class (enhanced layer). In the second transmission mode, a single video stream having the basic video stream inserted thereto is provided.

In both of the period of the high-precision program (first transmission mode) and the period of the conventional program (second transmission mode), "number_of_video_streams" of the multiple stream descriptor (Multiple_stream_descriptor) inserted into the layer of the transport stream TS is "001", and this indicates that the number of video elementary streams is one in any of the periods.

On the other hand, "scalable_enhancement_type" of the scalable enhancement descriptor (Scalable_enhancement_descriptor) inserted into the layer of the transport stream TS in the high-precision program (first transmission mode) is "01", and this indicates the spatial resolution scalability. "stream_delivery_type" of the descriptor is "1", and this indicates that the basic and enhancement video streams are provided in a single video elementary stream.

An SEI message (Enhancement scalability SEI message) is inserted into the basic stream. In the period of the high-precision program (first transmission mode), "enhancement_scalability_type" included in this SEI message is "01" indicating the spatial resolution scalability, and this means that the high-precision program (first transmission mode) can be identified. On the other hand, in the period of the conventional program (second transmission mode), the "enhancement_scalability_type" is "00", and this indicates that the period of the conventional program (second transmission mode) can be identified.

The switching control of the reception processing in the receiver 200 is performed, for example, as follows. When the reception processing is switched from the conventional program (second transmission mode) to the high-precision program (first transmission mode), first, the existence of the scalable enhancement descriptor (Scalable_enhancement_descriptor) allows the receiver 200 to identify the switching to the high-precision program (second transmission mode) in the layer of the transport stream TS. Thereafter, when "enhancement_scalability_type" of the SEI message (Enhancement scalability SEI message) inserted into the basic stream becomes "01", this allows the receiver 200 to identify switching to the high-precision program (second transmission mode) in the video layer. At this identified point in time (denoted as "Ta" in the drawing), the reception processing is switched from the conventional program (second transmission mode) to the high-precision program (first transmission mode).

On the other hand, when the reception processing is switched from the high-precision program (first transmission mode) to the conventional program (second transmission mode), first, the absence of the scalable enhancement descriptor (Scalable_enhancement_descriptor) allows the receiver 200 to identify the switching to the conventional program (second transmission mode) in the layer of the transport stream TS. Thereafter, "enhancement_scalability_type" of the SEI message (Enhancement scalability SEI message) inserted into the basic stream becomes "00", and this allows the receiver 200 to identify the switching to the conventional program (second transmission mode) in the video layer. At this identified point in time (denoted as "Tb" in the drawing), the reception processing is switched from the high-precision program (first transmission mode) to the conventional program (second transmission mode).

FIG. 30 illustrates an example of switching control of the reception processing. In this example, in the first transmission mode, the basic video stream and two enhancement video streams are inserted into three video elementary streams and are provided. In this case, the basic video stream includes image data (HD image data) in the lowest class (first class). The first enhancement video stream includes image data in the second class (high frequency component), and the second enhancement video stream includes image data in the third class (high frequency component). In the second transmission mode, a single video stream into which the basic video stream is inserted is provided.

In the period of the high-precision program (first transmission mode), "number_of_video_streams" of the multiple stream descriptor (Multiple_stream_descriptor) inserted into the layer of the transport stream TS is "011", and this means that the number of video elementary streams is three. On the other hand, in the period of the conventional program (second transmission mode), this "number_of_video_streams" is "001", and this means that the number of video elementary streams is one.

On the other hand, "scalable_enhancement_type" of the scalable enhancement descriptor (Scalable_enhancement_descriptor) inserted into the layer of the transport stream TS in the high-precision program (first transmission mode) is "01", and this indicates the spatial resolution scalability. "stream_delivery_type" of this descriptor is "0", and this indicates that the basic and enhancement video streams are provided in multiple video elementary streams.

An SEI message (Enhancement scalability SEI message) is inserted into the basic stream. In the period of the high-precision program (first transmission mode), "enhancement_scalability_type" included in this SEI message is "01" indicating the spatial resolution scalability and allowing the receiver 200 to identify the high-precision program (first transmission mode). On the other hand, in the period of the conventional program (second transmission mode), "enhancement_scalability_type" is "00", and this allows the receiver 200 to identify the period of the conventional program (second transmission mode).

Although detailed explanation is omitted, the example as shown in FIG. 30 is the same as the example as shown in FIG. 29 explained above in that the switching control of the reception processing in the receiver 200 is performed on the basis of the identification of program switching in the layer of the transport stream TS and the identification of program switching in the video layer thereafter.

As described above, in the first transmission mode, the image transmission/reception system 10 as shown in FIG. 1 transmits the basic video stream including image data in the lowest class constituting the scalable encoded image data and the predetermined number of enhancement video stream including image data in classes other than the lowest class constituting the scalable encoded image data, and in the second transmission mode, the image transmission/reception system 10 transmits only the basic video stream including the basic image data. Then, the identification information ("EHF", "BCF") for identifying the first mode and the second mode is inserted into the video stream.

Therefore, the reception-side can easily find whether the mode is the first transmission mode or the second transmission mode on the basis of the identification information, and the reception-side can appropriately cope with change in a stream configuration, and more specifically, the reception-side can appropriately cope with dynamic change in a distribution content, thus capable of performing correct stream reception. More specifically, when image data of conventional image and image data of spatially or temporally very high resolution image (scalable encoded image data) are transmitted in a time divisional manner, the reception-side can switch the processing in a preferable manner.

2. Modification

In the above embodiment, an example where the container is transport stream (MPEG-2 TS) has been shown. However, the present technique can also be applied to a system for distribution to reception terminals via a network such as the Internet. In the distribution of the Internet, the distribution is often performed using a container in a format of MP4 and other formats. More specifically, the containers may be containers of various kinds of formats such as transport stream (MPEG-2 TS) employed in the digital broadcast specification and MP4 used in the distribution of the Internet.

The present technique may be configured as follows.

(1) A transmission device including:
a transmission unit configured to transmit one or more video streams; and
an identification information insertion unit configured to insert, into the video stream, identification information for identifying a first transmission mode for transmitting a basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data.

(2) The transmission device according to (1), wherein in the first transmission mode, the identification information insertion unit inserts, into the video stream, identification information indicating the first transmission mode, and in the second transmission mode, the identification information insertion unit does not insert the identification information into the video stream.

(3) The transmission device according to (1), wherein in the first transmission mode, the identification information insertion unit inserts, into the video stream, identification information indicating the first transmission mode, and in the second transmission mode, the identification information insertion unit inserts, into the video stream, identification information indicating the second transmission mode.

(4) The transmission device according to (1), wherein in the first transmission mode, the identification information insertion unit does not insert the identification information into the video stream, and in the second transmission mode, the identification information insertion unit inserts, into the video stream, identification information indicating the second transmission mode.

(5) The transmission device according to any of (1) to (4), wherein the identification information insertion unit inserts the identification information into the basic video stream in at least a program unit, a scene unit, a picture group unit, or a picture unit.

(6) The transmission device according to any of (1) to (5), wherein in the first transmission mode, the transmission unit inserts the basic video stream and the predetermined number of enhancement video streams into one or more video elementary streams and transmits the one or more video elementary streams.

(7) The transmission device according to (6), wherein when the basic video stream and the predetermined number of enhancement video streams are inserted into the single video elementary stream to be transmitted, information indicating a stream border is arranged between the video streams.

(8) The transmission device according to any of (1) to (7), wherein when the identification information indicates the first transmission mode, the identification information includes information indicating the number of enhancement video streams.

(9) The transmission device according to any of (1) to (8), wherein when the identification information indicates the first transmission mode, the identification information includes information indicating a type of scalability enhancement.

(10) The transmission device according to any of (1) to (9), wherein when the identification information indicates the first transmission mode, the identification information includes information about a scaling ratio for combining with an upper class in scalability enhancement.

(11) The transmission device according to any of (1) to (10), wherein the transmission unit transmits a container of a predetermined format including the one or more video streams, and
the transmission device further includes an identification information insertion unit configured to insert, into a layer of the container, identification information for identifying whether the mode is the first transmission mode or the second transmission mode.

(12) The transmission device according to (11), wherein when the identification information indicates the first transmission mode, the identification information is attached with information indicating a type of scalability enhancement.

(13) The transmission device according to (11) or (12), wherein the identification information is attached with information indicating whether the one or more video streams is provided in a single video elementary stream or not.

(14) The transmission device according to any of (11) to (13), wherein when the identification information indicates the first transmission mode, the identification information is attached with information indicating the number of enhancement video streams.

(15) The transmission device according to any of (1) to (14), wherein the transmission unit transmits a container of a predetermined format including the one or more video streams, and
the transmission device further includes an identification information insertion unit configured to insert, into a layer of the container, identification information for identifying the number of video elementary streams into which the one or more video streams are inserted.

(16) A transmission method including:
a step of transmitting one or more video streams; and
a step of inserting, into a basic video stream, identification information for identifying a first transmission mode for transmitting the basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data.

(17) A reception device including:
a reception unit configured to receive one or more video streams;
a transmission mode identification unit configured to identify, on the basis of identification information inserted into the video stream, a first transmission mode for transmitting a basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data; and a processing unit configured to perform processing according to each mode based on the mode identification result to process the received video stream, and obtain image data to be displayed.

(18) A reception device according to claim 17, wherein the reception unit receives a container of a predetermined format including the video stream, identification information for identifying whether the mode is the first transmission mode or the second transmission mode is inserted into a layer of the container, and the transmission mode identification unit identifies whether the mode is the first transmission mode or the second transmission mode on the basis of identification information inserted into the layer of the container and identification information inserted into the video stream.

(19) A reception method including:

a step of receiving one or more video streams;

a step of identifying, on the basis of identification information inserted into the video stream, a first transmission mode for transmitting a basic video stream including image data in a lowest class constituting scalable encoded image data and a predetermined number of enhancement video streams each including image data in a class other than the lowest class constituting the scalable encoded image data and a second transmission mode for transmitting only the basic video stream including basic image data; and a step of performing processing according to each mode based on the mode identification result to process the received video stream, and obtain image data to be displayed.

The main feature of the present technique is that, when very high resolution image (basic stream and enhancement stream) and conventional image (basic stream) are transmitted in a time divisional manner, the transmission mode identification information (EHF, BCF) is inserted into the video stream, so that the reception-side can appropriately cope with change in a stream configuration, and more specifically, the reception-side can appropriately cope with dynamic change in a distribution content, thus capable of performing correct stream reception (see FIG. 13).

REFERENCE SIGNS LIST

10 Image transmission/reception system
100 Broadcast station
110 Transmission data generation unit
111 Image data output unit
112 Video encoder
113 Graphics data output unit
114 Graphics encoder
115 Audio data output unit
116 Audio encoder
117 Multiplexer
200 Receiver
201 CPU
211 Antenna terminal
212 Digital tuner
213 Transport stream buffer (TS buffer)
214 Demultiplexer
215 Coded buffer
216 Video decoder
217 Basic stream decoded buffer
218 Enhancement stream decoded buffer
219 Combining processing unit
220 Video RAM
221 Resolution increasing processing unit
222 Superimposing unit
231 Coded buffer
232 Graphics decoder
233 Pixel buffer
234 Scaler
241 Coded buffer
242 Audio decoder
243 Channel mixing unit

The invention claimed is:

1. A transmission device comprising:
an electronic memory; and
circuitry coupled to the electronic memory and configured
to transmit one or more video streams; and
insert, into a user data area of the video stream, identification information for identifying
a first transmission mode for transmitting a basic video stream including image data in a lowest class of possible image data classes, the image data including scalable encoded image data and a predetermined number of enhancement video streams each including image data in a class other than the lowest class constituting the scalable encoded image data, and
a second transmission mode for transmitting only the basic video stream including basic image data,
wherein periods of the first transmission mode and the second transmission mode are arranged in a predetermined order.

2. The transmission device according to claim 1, wherein in the first transmission mode, the circuitry inserts, into the video stream, identification information indicating the first transmission mode, and in the second transmission mode, the circuitry does not insert the identification information into the video stream.

3. The transmission device according to claim 1, wherein in the first transmission mode, the circuitry inserts, into the video stream, identification information indicating the first transmission mode, and in the second transmission mode, the circuitry inserts, into the video stream, identification information indicating the second transmission mode.

4. The transmission device according to claim 1, wherein in the first transmission mode, the circuitry does not insert the identification information into the video stream, and in the second transmission mode, the circuitry inserts, into the video stream, identification information indicating the second transmission mode.

5. The transmission device according to claim 1, wherein the circuitry inserts the identification information into the basic video stream in at least a program unit, a scene unit, a picture group unit, or a picture unit.

6. The transmission device according to claim 1, wherein in the first transmission mode, the circuitry inserts the basic video stream and the predetermined number of enhancement video streams into one or more video elementary streams and transmits the one or more video elementary streams.

7. The transmission device according to claim 6, wherein when the basic video stream and the predetermined number of enhancement video streams are inserted into the single video elementary stream to be transmitted, information indicating a stream border is arranged between the video streams.

8. The transmission device according to claim 1, wherein when the identification information indicates the first transmission mode, the identification information includes information indicating the number of enhancement video streams.

9. The transmission device according to claim 1, wherein when the identification information indicates the first transmission mode, the identification information includes information indicating a type of scalability enhancement.

10. The transmission device according to claim 1, wherein when the identification information indicates the first transmission mode, the identification information includes information about a scaling ratio for combining with an upper class in scalability enhancement.

11. The transmission device according to claim 1, wherein the circuitry transmits a container of a predetermined format including the one or more video streams, and
the circuitry is further configured to insert, into a layer of the container, identification information for identifying whether the mode is the first transmission mode or the second transmission mode.

12. The transmission device according to claim 11, wherein when the identification information indicates the first transmission mode, the identification information is attached with information indicating a type of scalability enhancement.

13. The transmission device according to claim 11, wherein the identification information is attached with information indicating whether the one or more video streams is provided in a single video elementary stream or not.

14. The transmission device according to claim 11, wherein when the identification information indicates the first transmission mode, the identification information is attached with information indicating the number of enhancement video streams.

15. The transmission device according to claim 1, wherein the circuitry transmits a container of a predetermined format including the one or more video streams, and
the circuitry is further configured to insert, into a layer of the container, identification information for identifying the number of video elementary streams into which the one or more video streams are inserted.

16. A transmission method comprising:
transmitting, with circuitry, one or more video streams; and
inserting, with the circuitry and into a user data area of a basic video stream, identification information for identifying
a first transmission mode for transmitting the basic video stream including image data in a lowest class of possible image data classes, the image data including scalable encoded image data and a predetermined number of enhancement video streams each including image data in a class other than the lowest class constituting the scalable encoded image data, and
a second transmission mode for transmitting only the basic video stream including basic image data,
wherein periods of the first transmission mode and the second transmission mode are arranged in a predetermined order.

17. A reception device comprising:
an electronic memory; and
circuitry coupled to the electronic memory and configured to
receive one or more video streams;
identify, on the basis of identification information inserted into a user data area of the video stream,
a first transmission mode for transmitting a basic video stream including image data in a lowest class of possible image data classes, the image data including scalable encoded image data and a predetermined number of enhancement video streams each including image data in a class other than the lowest class constituting the scalable encoded image data, and
a second transmission mode for transmitting only the basic video stream including basic image data; and
perform processing according to each mode based on the mode identification result to process the received video stream, and obtain image data to be displayed,
wherein periods of the first transmission mode and the second transmission mode are arranged in a predetermined order.

18. The reception device according to claim 17, wherein the circuitry receives a container of a predetermined format including the video stream,
identification information for identifying whether the mode is the first transmission mode or the second transmission mode is inserted into a layer of the container, and
the circuitry identifies whether the mode is the first transmission mode or the second transmission mode on the basis of identification information inserted into the layer of the container and identification information inserted into the video stream.

19. A reception method comprising:
receiving, with circuitry, one or more video streams;
identifying, with the circuitry and on the basis of identification information inserted into a user data area of the video stream,
a first transmission mode for transmitting a basic video stream including image data in a lowest class of possible image data classes, the image data including scalable encoded image data and a predetermined number of enhancement video streams each including image data in a class other than the lowest class constituting the scalable encoded image data, and
a second transmission mode for transmitting only the basic video stream including basic image data; and
performing, with the circuitry, processing according to each mode based on the mode identification result to process the received video stream, and obtain image data to be displayed,
wherein periods of the first transmission mode and the second transmission mode are arranged in a predetermined order.

* * * * *